United States Patent
Zeng et al.

(10) Patent No.: US 12,136,133 B1
(45) Date of Patent: Nov. 5, 2024

(54) METHOD FOR PERFORMING MULTI-STAGE MULTI-LEVEL COOPERATIVE OPERATION ON PARK INTEGRATED ENERGY SYSTEM CONTAINING MINERAL INDUSTRY USER

(71) Applicant: NORTH CHINA ELECTRIC POWER UNIVERSITY, Beijing (CN)

(72) Inventors: Bo Zeng, Beijing (CN); Chen Wu, Beijing (CN); Yunxiao Zhang, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 0 days.

(21) Appl. No.: 18/764,073

(22) Filed: Jul. 3, 2024

(30) Foreign Application Priority Data

Aug. 1, 2023 (CN) .......................... 202310960670.7

(51) Int. Cl.
*G06Q 50/06* (2024.01)
*G06Q 10/04* (2023.01)

(52) U.S. Cl.
CPC .............. *G06Q 50/06* (2013.01); *G06Q 10/04* (2013.01)

(58) Field of Classification Search
CPC ............................... G06Q 50/06; G06Q 10/04
USPC ....................................................... 705/412
See application file for complete search history.

(56) References Cited

U.S. PATENT DOCUMENTS 11,391,151 B2 *  7/2022  Ju ........................... E21C 35/24
2020/0223638 A1 *  7/2020  Kou ........................ B65G 15/32

OTHER PUBLICATIONS

"Environmental issues from coal mining and their solutions" Published by Elsevier (Year: 2010).*

* cited by examiner

*Primary Examiner* — Zeina Elchanti
(74) *Attorney, Agent, or Firm* — IPRO, PLLC

(57) ABSTRACT

The present disclosure discloses a method for performing multi-stage multi-level cooperative operation on a park integrated energy system containing a mineral industry user. The method includes: constructing a short-time scale dynamic pricing model, including an upper-layer CMIES operation optimization model and a lower-layer user demand response model; solving the short-time scale dynamic pricing model to obtain day-ahead and intraday scheduling plans and a next-day electricity price; and based on the day-ahead and intraday scheduling plans and the next-day electricity price, computing a strategy transfer probability distribution of each subject within a preset deadline, and simulating a decision-making process by a Monte Carlo method until each subject reaches a correlated equilibrium state to obtain a pricing solution of CMIES within the preset deadline. According to the present disclosure, the energy utilization efficiency of the system can be improved, and the operation cost can be reduced.

15 Claims, 3 Drawing Sheets

METHOD FOR PERFORMING MULTI-STAGE MULTI-LEVEL COOPERATIVE OPERATION ON PARK INTEGRATED ENERGY SYSTEM CONTAINING MINERAL INDUSTRY USER

TECHNICAL FIELD

The present disclosure relates to the field of electric power systems, and in particular, to a method for performing multi-stage multi-level cooperative operation on a park integrated energy system containing a mineral industry user.

BACKGROUND

Driven by the carbon neutrality goal, the global energy industry actively promotes the low-carbon transformation of a supply structure, but due to the important position of coal in primary energy, coal cannot be removed completely at present, and the global energy supply still highly depends on coal. Large mines undertake the important task of energy supply.

However, due to the low energy utilization efficiency, the energy consumption and the pollutant emission mass of a mine system are very large, so the mine system is the focus of decarbonization. Therefore, on the premise of ensuring the reliable supply of coal, it is urgent to study an efficient, low-carbon and clean operation strategy.

SUMMARY

Therefore, the present disclosure provides a method for performing multi-stage multi-level cooperative operation on a park integrated energy system containing a mineral industry user, so as to solve or at least relieve the above problems.

According to one aspect of the present disclosure, a method for performing multi-stage multi-level cooperative operation on a park integrated energy system containing a mineral industry user is provided. The method includes: constructing a short-time scale dynamic pricing model, where the short-time scale dynamic pricing model includes an upper-layer operation optimization model and a lower-layer user demand response model, the operation optimization model is constructed to minimize the sum of integrated operation costs at a day-ahead stage and an intraday stage, and the user demand response model is constructed to minimize the sum of an actual electricity-purchasing cost of the user and the electricity benefit loss in the demand response; solving the short-time scale dynamic pricing model based on a Karush-Kuhn-Tucker condition and a Benders decomposition method to obtain day-ahead and intraday scheduling plans and a next-day electricity price; and based on the obtained day-ahead scheduling plan, intraday scheduling plan and next-day electricity price, computing a strategy transfer probability distribution of each market subject within a preset deadline by improved regret degree matching mechanism, and simulating a decision-making process by a Monte Carlo method until each market subject reaches a correlated equilibrium state to obtain a pricing solution of the park integrated energy system within the preset deadline.

Optionally, in the method according to the present disclosure, the operation optimization model includes a first objective function and a second objective function.

The first objective function includes:

$$\min C_{all} = C_{trade} + C_{st} + C_{coal} + C_{operate}^{CFU-RTO} + C_{CO2}^{CU-RTO} + C_{vam} + C_{RT}$$

where, $C_{all}$ represents the sum of integrated operation costs at the day-ahead stage and the intraday stage, $C_{trade}$ represents a day-ahead market electricity-purchasing cost of the park integrated energy system and a net electricity-purchasing cost of the electricity selling income of the retail market, $C_{st}$ represents a device start-stop cost, $C_{coal}$ represents a fuel cost of a coal-fired unit, $C_{operate}^{CFU-RTO}$ represents an operation and maintenance cost of the coal-fired unit and a ventilation air oxidation and power generation unit, $C_{CO2}^{CU-RTO}$ represents a carbon emission cost, $C_{vam}$ represents a waste ventilation air penalty cost, and $C_{RT}$ represents an integrated operation cost at the intraday stage.

The second objective function includes:

$$\min W_{user} = \sum_{t=1}^{T} P_{sell}^t \pi_{sell}^t + \sum_{t=1}^{T} \sum_{t'=1}^{T} \alpha_{SL}^t |t' - t| P_{tt'} + \sum_{t=1}^{T} [\alpha_{IL}^t (r_{IL}^t P_{user}^t - P_{IL}^t) + \beta_{IL}^t]$$

where $W_{user}$ represents the sum of the actual electricity-purchasing cost of the user and the electricity benefit loss in the demand response, $P_{sell}^t$ and $\pi_{sell}^t$ respectively represent an electric quantity and a price of the park integrated energy system participating in retail transaction at a period t, $\alpha_{SL}^t$ represents a benefit loss coefficient of a time transferable load at the period t, $P_{tt'}$ represents a load quantity transferred from the period t to a period t', $\alpha_{IL}^t$ and $\beta_{IL}^t$ represent benefit loss coefficients of a reducible load, $r_{IL}^t$ represents a proportion of the reducible load at the period t, $P_{user}^t$ represents a total load of the user at the period t, $P_{IL}^t$ represents a reducible load value at the period t, and T represents the total number of periods.

Optionally, in the method according to the present disclosure, the park integrated energy system includes an energy supply subsystem, an energy recovery subsystem and an energy storage subsystem; and correspondingly, the operation optimization model includes a constraint of the energy supply subsystem, a constraint of an energy cycle subsystem and a constraint of the energy storage subsystem.

Optionally, in the method according to the present disclosure, the constraint of the energy supply subsystem includes: an operation constraint of a coal-fired unit, a start-stop constraint of the coal-fired unit, a cooperation operation constraint of a belt conveyor and a coal silo, an upper and lower limit constraint and a ramp constraint of the belt speed of the belt conveyor, a constraint between a coal import and export flow and a reserve of a clean coal silo, and a constraint between a coal import and export flow and a reserve of a gangue silo.

Optionally, in the method according to the present disclosure, the constraint of the energy cycle subsystem includes: an operation constraint of a microturbine, an operation constraint of a ventilation air oxidation and power generation unit, a start-stop constraint of the ventilation air oxidation and power generation unit and an operation constraint of a water source heat pump.

Optionally, in the method according to the present disclosure, the constraint of the energy storage subsystem includes: an operation constraint of pumped storage, a ramp constraint of charging and discharging powers of the pumped storage, and an operation constraint of a heat storage tank.

Optionally, in the method according to the present disclosure, the operation optimization model further includes an electric power and heat power equilibrium constraint of the park integrated energy system, an upper limit constraint of a renewable energy output, an upper limit constraint of an electricity purchasing quantity of a mine integrated energy operator and an upper limit constraint of an electricity selling price.

Optionally, in the method according to the present disclosure, the user demand response model includes a constraint of the reducible load, a constraint of the time transferable load, and an electric quantity constraint of the park integrated energy system participating in retail transaction.

Optionally, in the method according to the present disclosure, the solving the short-time scale dynamic pricing model based on a Karush-Kuhn-Tucker condition and a Benders decomposition method includes: representing the optimal solution of the user demand response model through the necessary and sufficient Karush-Kuhn-Tucker condition, and converting the short-time scale dynamic pricing model from double layers to a single layer; dividing the converted short-time scale dynamic pricing model into a master problem and subproblems, where related variables of the coal-fired unit and a ventilation airoxidation unit are taken as complex variables required to be optimized in the master problem, and each real-time scenario is taken as one subproblem; and sequentially solving the master problem and the subproblems, and computing upper and lower bounds of the original objective function and separating an optimal cut until a difference value between the upper and lower bounds meet a convergence condition to obtain the day-ahead and intraday scheduling plans and the next-day electricity price.

Optionally, in the method according to the present disclosure, in the step of computing the strategy transfer probability distribution of each market subject within the preset deadline by the improved regret degree matching mechanism, the strategy transfer probability of each market subject in a next contract period is computed by the following formulas:

$$x_{n+1}^k(j) = \left(1 - \frac{\sigma}{n^\gamma}\right) \min\left\{\frac{1}{\lambda} R_n^k(j, i), \frac{1}{S^k}\right\} + \frac{\sigma}{n^\gamma} \frac{1}{s^k}$$

$$\forall j \in \prod^k \text{ and } j \neq i$$

$$x_{n+1}^k(i) = 1 - \Sigma_{j \in \pi^k \text{ and } j \neq i} x_{n+1}^k(j)$$

where $x_{n+1}^k(j)$ and $x_{n+1}^k(i)$ respectively represent a probability of selecting a new decision j and still insisting on the current decision i in the $(n+1)^{th}$ decision by the market subject k, $\sigma$ represents a weight factor of the current strategy preference degree, $\mu \in (0, \frac{1}{4})$, $\lambda$ represents a proportionality coefficient and $\lambda \geq 2MS^k$, M represents upper bound values of utility functions of all the strategies in a strategy set of the market subject k, $S^k$ represents a cardinal number of the strategy set of the market subject k, $R_n^k(j,i)$ represents the regret degree of regretting selecting the current strategy i instead of selecting the strategy j by the market subject k after the $n^{th}$ decision, and $\Pi^k$ represents the strategy set of the market subject k.

Optionally, in the method according to the present disclosure, whether each market subject reaches the correlated equilibrium state is detected by the following formula:

$$\Sigma_{\mu \in S: \mu^k = j} \psi(\mu)(W^k(i, \mu^{-k}) - W^k(\mu)) \leq 0$$

where $\mu$ represents a vector formed by the current strategy of each market subject, S represents a vector space replaced by all possible strategies, $\mu^k = j$ represents that the current strategy of the market subject k is j, $\mu^{-k}$ represents a vector formed by the current strategy of other market subjects except the market subject k, $\psi(\mu)$ represents a probability corresponding to the strategy vector $\mu$, $W^k(i, \mu^{-k})$ represents a benefit function value of the market subject k replacing the strategy j with the strategy i, and $W^k(\mu)$ represents a benefit function value of the market subject k adopting the original strategy.

According to another aspect of the present disclosure, a computing device is provided. The computing device includes: at least one processor; and a memory, storing a program instruction, where the program instruction is configured to be suitable for being executed by the at least one processor, and the program instruction includes an instruction for performing the method according to the present disclosure.

According to yet another aspect of the present disclosure, a readable storage medium storing a program instruction is provided, where when the program instruction is read and executed by a computing device, the computing device performs the method according to the present disclosure.

According to the present disclosure, a multi-time scale operation model of the CMIES is constructed in a completely competitive retail market environment. On a short-time scale, the uncertainty of a renewable energy output is processed by a day-ahead-intraday two-stage random optimization method. On a long-time scale, a strategy transfer probability distribution of the market subject is described by the improved regret degree matching mechanism. Full iterative guidance achieves correlated equilibrium, the energy utilization efficiency of the system is improved, and the operation cost is reduced.

BRIEF DESCRIPTION OF DRAWINGS

To achieve the above-mentioned and related objectives, some illustrative aspects are described herein in connection with the following description and the accompanying drawings, which indicate various ways of implementing the principles disclosed herein, and all aspects and their equivalents are intended to fall within the scope of the claimed subject matter. The above-mentioned and other objectives, features and advantages of the present disclosure will become clearer with reference to the following detailed description in conjunction with the accompanying drawings. Throughout the present disclosure, like reference numerals generally refer to like components or elements.

DETAILED DESCRIPTION OF THE EMBODIMENTS

Exemplary embodiments of the present disclosure will be described in more detail below with reference to the accompanying drawings. Although the illustrative examples of the present disclosure are shown in the accompanying drawings, it should be understood that the present disclosure may be implemented in various forms and should not be limited to the examples illustrated herein. Rather, these examples are provided such that the present disclosure can be understood more thoroughly and the scope of the present disclosure can be fully conveyed to those skilled in the art.

Coalbed methane (gas), ventilation air, burst water, gangue and other derived energy are not utilized completely in the traditional coal mine production process, which has potential safety hazard and environmental pollution. In fact, the derived resources are rich in energy, an integrated energy technology is applied to a coal mine production scenario, a park integrated energy system containing a mineral industry user, or coal mine integrated energy system (CMIES) for short, is constructed, and the derived energy is developed and utilized for heat generation and power generation, so that the problems of low energy utilization efficiency and environmental pollution can be solved. In addition, with the continuous promotion of the carbon emission reduction policy, mineral integrated energy operators are qualified to allocate sufficient renewable power generation resources. In addition to supplying electricity for production, the surplus electricity can also participate in the retail market to sell electricity to obtain income. Therefore, the present disclosure provides a method for performing multi-stage multi-level cooperative operation on a park integrated energy system containing a mineral industry user, so as to study operation optimization management of CMIES and a long-term income increasing strategy in the retail market.

Figure 1:
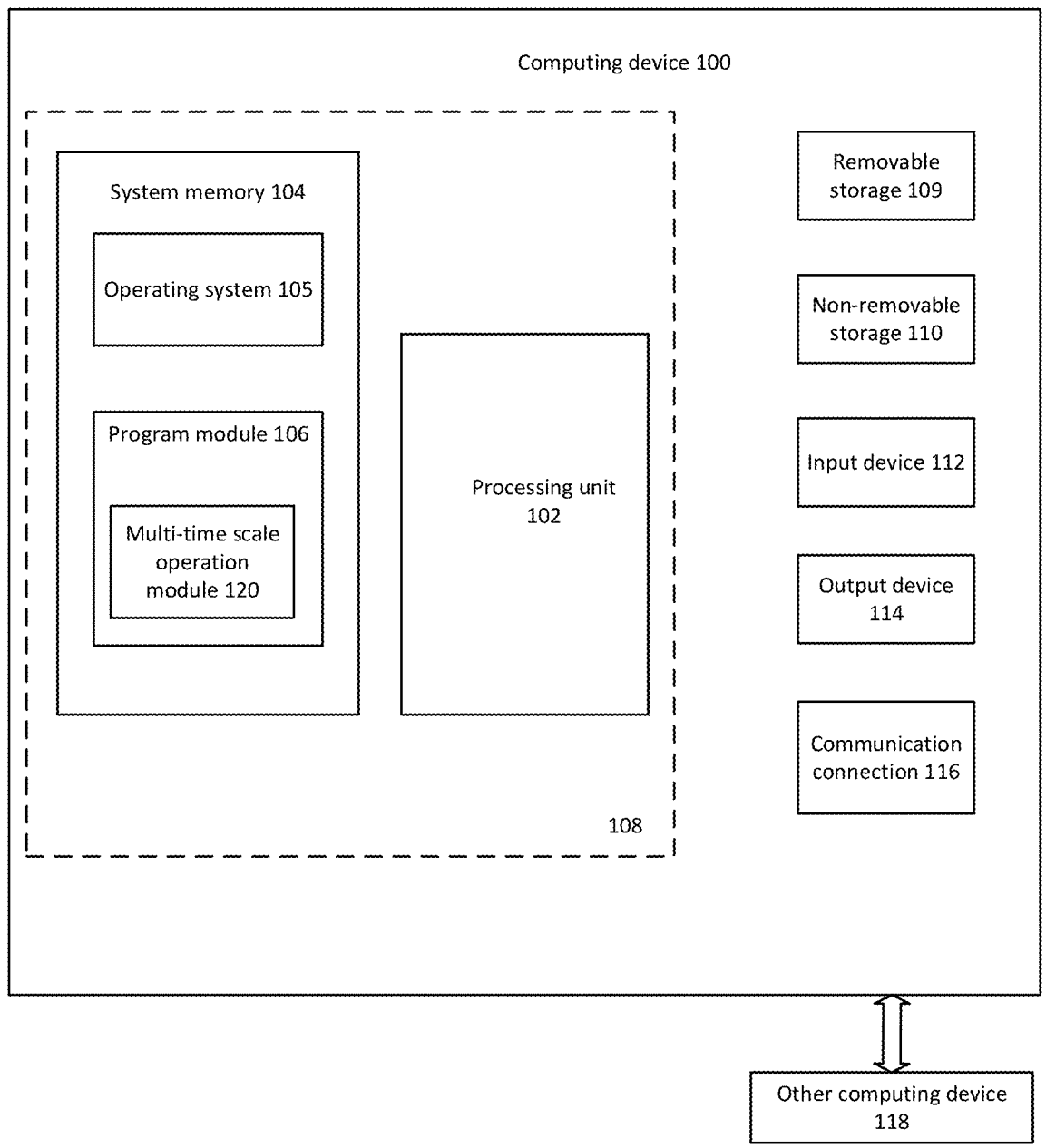
FIG. 1 is a structural block diagram of a computing device 100 according to some embodiments of the present disclosure.

The method for performing multi-stage multi-level cooperative operation on a park integrated energy system containing a mineral industry user according to the present disclosure can be performed in a computing device. FIG. 1 shows a block diagram of a physical assembly (that is, hardware) of a computing device 100. In the basic configuration, the computing device 100 includes at least one processing unit 102 and a system memory 104. According to one aspect, the processing unit 102 may be implemented as a processor depending on the configuration and type of the computing device. The system memory 104 includes, but is not limited to volatile storage (such as random access memory), nonvolatile storage (such as read only memory), a flash memory or any combination of the memories. According to one aspect, the system memory 104 includes an operating system 105 and a program module 106, where the program module 106 includes a multi-time scale operation module 120, and the multi-time scale operation module 120 is configured to perform a method 200 for performing multi-stage multi-level cooperative operation on a park integrated energy system containing a mineral industry user.

According to one aspect, the operating system 105, for example, is suitable for controlling the operation of the computing device 100. In addition, examples are practiced in conjunction with graphic libraries, other operating systems or any other application programs, and are not limited to any specific application or system. The basic configuration is shown through those assemblies in a dotted line 108 in FIG. 1. According to one aspect, the computing device 100 has additional features or functions. For example, according to one aspect, the computing device 100 includes additional data storage devices (removable and/or non-removable), such as magnetic disks, optical disks or magnetic tapes. Such additional storage is shown in FIG. 1 by removable storage 109 and non-removable storage 110.

As stated above, according to one aspect, the program module is stored in the system memory 104. According to one aspect, the program module may include one or more application programs. The present disclosure is not limited to the types of the application programs. For example, the application programs may include: an E-mail and contact application program, a word processing application program, a spreadsheet application program, a database application program, a slide show application program, a painting or computer aid application program, a network browser application program and the like.

According to one aspect, examples may be practiced on a circuit including a discrete electronic component, a logic door-including encapsulated or integrated electronic chip, a circuit using a microprocessor or a single chip including an electronic component or a microprocessor. For example, examples may be practiced through a system on chip (SOC) in which each or a plurality of assemblies shown in FIG. 1 may be integrated on a single integrated circuit. According to one aspect, such an SOC device may include one or more processing units, graphic units, communication units, system virtualization units, and various application functions, all of which serve as a single integrated circuit to be integrated (or burned) on a chip substrate. When operation is performed by the SOC, the functions described in the specification may be operated through dedicated logic integrated with other assemblies of the computing device 100 on the single integrated circuit (chip). The embodiments of the present disclosure may further be practiced by other technologies capable of performing logic operations (such as AND, OR and NOT). All other technologies include, but are not limited to mechanical, optical, fluid and quantum technologies. In addition, the embodiments of the present disclosure may be practiced in a general-purpose computer, any other circuits or systems.

According to one aspect, the computing device 100 may further have one or more input devices 112, for example, a keyboard, a mouse, a pen, a voice input device, a touch input device and the like. The computing device may further include an output device 114, for example, a display, a loudspeaker, a printer and the like. The aforementioned devices are examples, and other devices may be used. The computing device 100 may include one or more communication connections 116 that allow communication with other computing devices 118. Examples of appropriate communication devices 116 include, but are not limited to: an RF transmitter, a receiver and/or a transceiver circuit; and a universal serial bus (USB) and a parallel and/or serial port.

As used herein, the term "computer-readable medium" includes a computer storage medium. The computer storage medium may include volatile and non-volatile, removable and non-removable mediums which are implemented by any method or technology for storing information (for example, a computer readable instruction, a data structure or a program module). The system memory 104, the removable storage 109 and the non-removable storage 110 are examples of the computer storage medium (that is, memory storage). The computer storage medium may include a random access memory (RAM), a read-only memory (ROM), an electrically erasable programmable read-only memory (EEPROM), a flash memory or other memory technologies, CD-ROM, a digital video disk (DVD) or other optical storages, a magnetic cassette, a magnetic tape, a magnetic disk storage or other magnetic storage devices, or any other products that can be used to store information and accessible by the computing device 100. According to one aspect, any such computer storage medium may be a part of the computing device 100. The computer storage medium does not include carrier waves or other propagated data signals.

According to one aspect, a communication medium is implemented by a computer readable instruction, a data structure, a program module or other data in a modulated data signal (for example, a carrier wave or other transmission mechanism), and includes any information transfer medium. According to one aspect, the term "modulated data signal" describes a signal that has one or more feature sets or is changed by encoding information in the signal. As an example but not a limitation, the communication medium includes a wired medium such as a wired network or a direct wired connection, and a wireless medium such as acoustic, radio frequency (RF), infrared and other wireless mediums.

Figure 2:
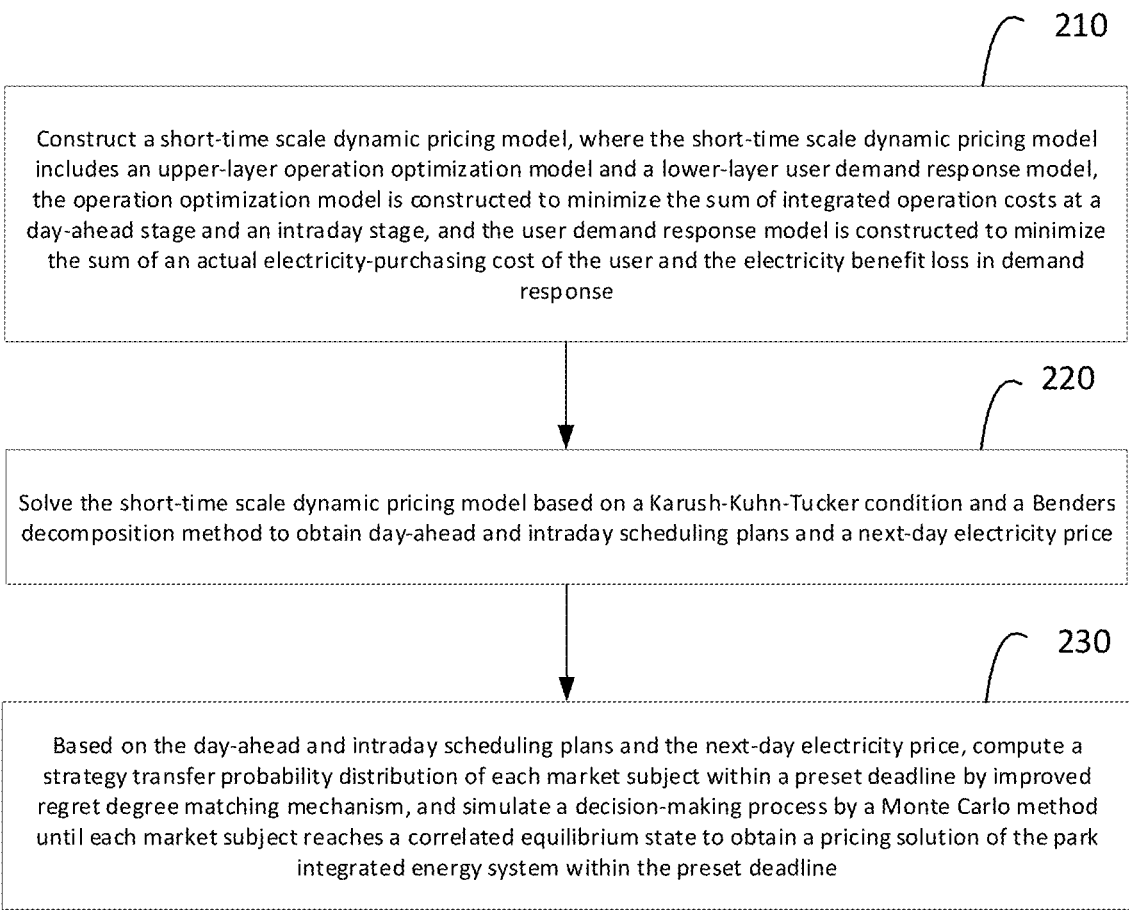
FIG. 2 is a flowchart of a method 200 for performing multi-level cooperative operation on a park integrated energy system containing a mineral industry user according to some embodiments of the present disclosure.

FIG. 2 is a flowchart of a method 200 for performing multi-level cooperative operation on a park integrated energy system containing a mineral industry user according to some embodiments of the present disclosure. The method 200 is suitable for being performed in the computing device (for example, the computing device 100 shown in FIG. 1).

Figure 3:
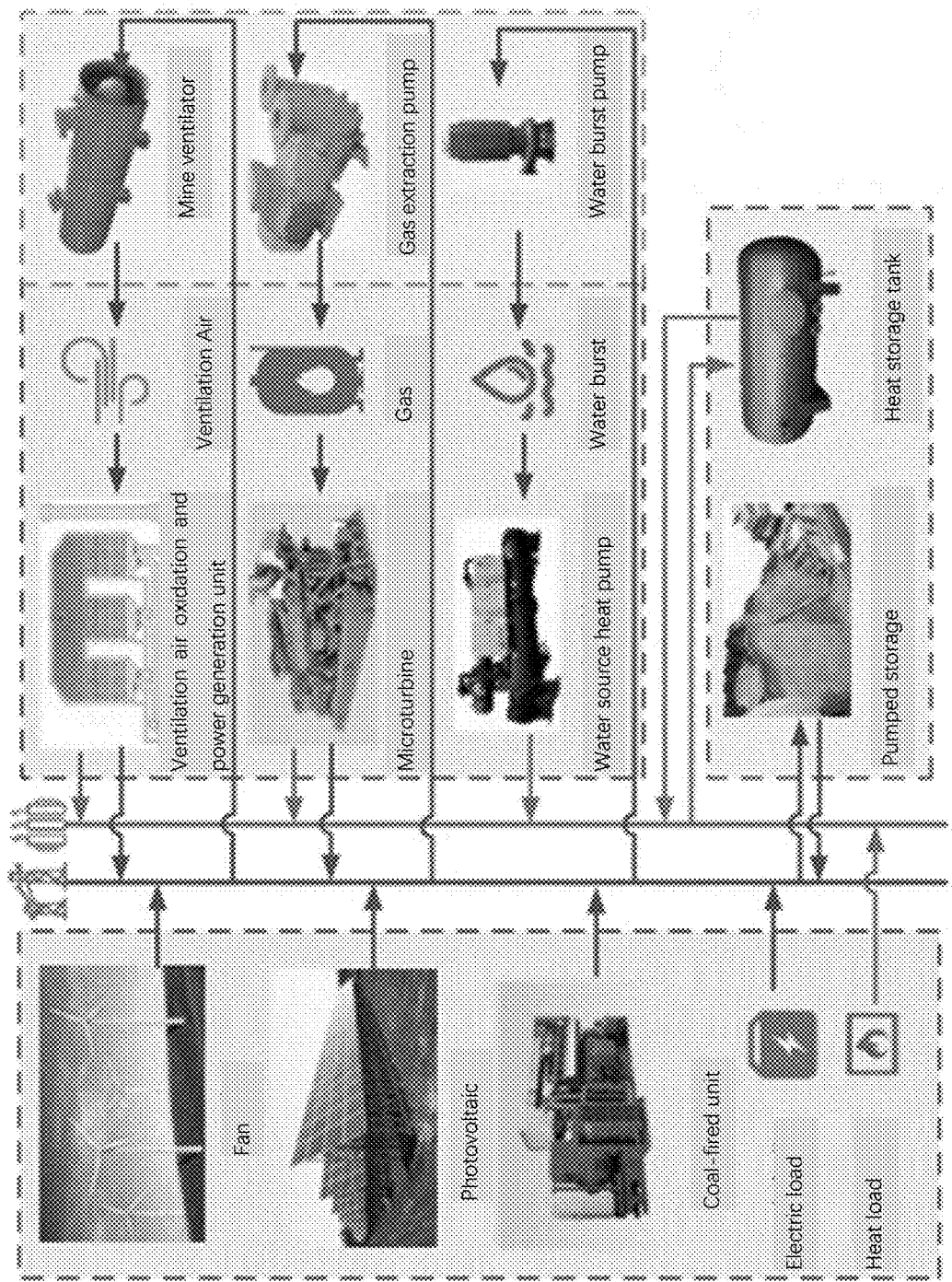
FIG. 3 is a schematic diagram of an energy cycle topological diagram of a park integrated energy system containing a mineral industry user according to some embodiments of the present disclosure.

Here, the integrated energy system CMIES according to the present disclosure is described first. The park integrated energy system according to the present disclosure may be divided into three subsystems: an energy supply subsystem, an energy recovery subsystem and an energy storage subsystem, and the whole energy cycle topological architecture is shown in FIG. 3. The energy supply subsystem mainly ensures reliable supply of system electric energy, including renewable energy and coal-fired power generation. In addition to maintaining the electricity for the production of a mineral industry user, most of the supplied electric energy can be sent out to participate in the retail market for profit. The energy recovery subsystem recycles the derived resources of the coal mine, processes the resources such as ventilation air, gas and burst water to perform heat generation and power generation, and is a key part of CMIES electrothermal coupling. On the other hand, the large mass of the derived energy will threaten the mine safety. Therefore, a mine security device may be configured in the CMIES, which can capture and collect the derived energy and send the derived energy to the energy recovery subsystem in time while consuming electric energy. Therefore, according to the present disclosure, the mine security device is incorporated into the energy recovery subsystem. The energy storage subsystem includes pumped storage reconstructed by a waste mine, and a heat storage tank. During real-time operation, the energy storage subsystem responds to a system price level and a supply and demand balance relationship, thereby maximally reducing the operation cost of the CMIES and enlarging the profit space. The flexible coordination of the above subsystems can promote the circular flow of energy, improve the energy utilization efficiency of the system and reduce the integrated operation cost.

In addition, the CMIES takes coal mine product as a core task and usually select the position according to the mineral conditions, which is generally located in a remote place and has high cost of supplying heat to the city center. Therefore, if the economic benefits are pursued, the mineral integrated energy operators generally do not consider participation in the heat market to sell heat to the demand side. Accordingly, the present disclosure only considers the interaction between the CMIES and the electricity market. Specifically, taking CMIES under the incomplete information environment as a research object and considering that the mineral integrated energy operator signs a contract with a user at a demand side, an explicit price is not agreed, and only the upper price limit meeting the psychological expectation is constrained. Furthermore, multi-level research is performed from a short-time scale to a medium and long-time scale. Specifically, on the short-time scale: before the natural data starts and on the basis of predicting the balance between electricity supply and demand, the mineral integrated energy operator aims at improving the operation benefit of the CMIES and minimizing the integrated electricity-purchasing cost of the contract user, builds an optimization model to determine and release the next-day electricity price to the user at the day-ahead stage. On the medium and long-time scale: considering the information asymmetry between each subject, a bidding strategy transfer process and a user energy-purchasing strategy evolution process are modeled, operation simulation research is carried out, and the time sequence dependence of decision making at each stage is deeply dug, so that the market equilibrium state is achieved.

As shown in FIG. 2, the method 200 for performing multi-stage multi-level cooperative operation on a park integrated energy system containing a mineral industry user according to the present disclosure begins at 210.

In 210, a short-time scale dynamic pricing model is constructed. The short-time scale dynamic pricing model includes an upper-layer operation optimization model and a lower-layer user demand response model. Specifically, the user demand response model is constructed to minimize the sum of an actual electricity-purchasing cost of the user and the electricity benefit loss in the demand response. The operation optimization model is constructed to minimize the sum of integrated operation costs at a day-ahead stage and an intraday stage in the CMIES. In some embodiments, a time granularity at the day-ahead stage may be 1 hour, and a time granularity at the intraday stage may be 15 minutes. Of course, this is only an example, and the present disclosure is not limited to this.

Then, the operation optimization model and the user demand response model are described.

According to one embodiment of the present disclosure, the operation optimization model includes an objective function. For convenience of description, the objective function is referred to as a first objective function in the present disclosure. The integrated operation cost at the day-ahead stage may mainly consider a net electricity-purchasing cost $C_{trade}$ (including a day-ahead market electricity-purchasing cost and a electricity selling income of the retail market of the CMIES), a device start-stop cost $C_{st}$, a unit fuel cost $C_{coal}$, an operation and maintenance cost $C_{operate}^{CFU-RTO}$ of the coal-fired unit and the ventilation air oxidation and power generation unit, a carbon emission cost $C_{CO2}^{CFU-RTO}$ and a waste ventilation air penalty cost $C_{vam}$. Therefore, in some embodiments, the first objective function may be specifically as follows:

$$\min C_{all} = C_{trade} + C_{st} + C_{coal} + C_{operate}^{CFU-RTO} + C_{CO2}^{CFU-RTO} C_{vam} + C_{RT}$$

where, $C_{all}$ represents the sum of integrated operation costs at the day-ahead stage and the intraday stage, $C_{trade}$ represents a day-ahead market electricity-purchasing cost of the park integrated energy system and a net electricity-purchasing cost of the electricity selling income of the retail market, $C_{st}$ represents a device start-stop cost, $C_{coal}$ represents a fuel cost of a coal-fired unit, $C_{operate}^{CFU-RTO}$ represents an operation and maintenance cost of the coal-fired unit and a ventilation air oxidation and power generation unit, $C_{CO2}^{CFU-RTO}$ represents a carbon emission cost, $C_{vam}$ represents a waste ventilation air penalty cost, and $C_{RT}$ represents an integrated operation cost at the intraday stage.

Specifically, the net electricity-purchasing cost $C_{trade}$ can be obtained by the following formula:

$$c_{trade} = \sum_{t=1}^{T}(P_{grid}^t \pi_{grid}^t - P_{sell}^t \pi_{sell}^t)\Delta t$$

where $P_{grid}^t$ and $\pi_{grid}^t$ respectively represent an electric quantity purchased from the power grid and a price thereof that the park integrated system at the period t, $P_{sell}^t$ and $\pi_{sell}^t$ respectively represent an electric quantity participating in the retail traction and a price thereof of the park integrated energy system at the period t, $\Delta t$ represents a duration of one period, and T represents the total number of the periods. For example, when one day is divided into 24 periods, the total number of the periods is 24, of course, this is only an example, which is not limited by the present disclosure.

The device start-stop cost $C_{st}$ can be obtained by the following formula:

$$C_{st} = \sum_{t=1}^{T}(C_{su}^{CFU}\mu_{CFU,su}^t + C_{sd}^{CFU}\mu_{CFU,sd}^t + C_{su}^{RTO}\mu_{RTO,su}^t + C_{sd}^{RTO}\mu_{RTO,sd}^t)$$

where $C_{su}^{CFU}$ and $C_{sd}^{CFU}$ respectively represent unit start and stop costs of the coal-fired unit, that is, respectively represent one-time start and one-time stop costs of the coal-fired unit, $C_{su}^{RTO}$ and $C_{sd}^{RTO}$ respectively represent unit start and stop costs of the ventilation air oxidation and power generation unit, $\mu_{CFU,su}^t$ and $\mu_{CFU,sd}^t$ respectively represent start and stop action variables of the coal-fired unit at the period t, with a value of 1 or 0, $\mu_{CFU,su}^t$ with the value of 1 represent that the coal-fired unit performs a start action at the period t, $\mu_{CFU,su}^t$ with the value of 0 represents that the coal-fired unit does not perform a start action at the period t, $\mu_{CFU,sd}^t$ with the value of 1 represents that the coal-fired unit performs a stop action at the period t, $\mu_{CFU,sd}^t$ with the value of 0 represents that the coal-fired unit does not perform a stop action at the period t, and $\mu_{RTO,su}^t$ and $\mu_{RTO,sd}^t$ respectively represent start and stop action variables of the ventilation air oxidation unit at the period t, with values of 1 or 0.

The fuel cost $C_{coal}$ of the coal-fired unit can be obtained by the following formula:

$$C_{coal} = \sum_{t=1}^{T} M_{coal}^t c_{coal} \Delta t$$

where $c_{coal}$ represents the price of coal, and $M_{coal}^t$ represents a mass (kg/h) of the original coal of the coal unit entering per unit time at the period t.

The operation and maintenance costs $C_{operate}^{CFU-RTO}$ of the coal-fired unit and the ventilation air oxidation and power generation unit can be obtained by the following formula:

$$C_{operate}^{CFU-RTO} = \sum_{t=1}^{T}(c_{CFU} \times P_{CFU}^t + C_{RTO} \times P_{RTO}^t)\Delta t$$

where $C_{CFU}$ and $C_{RTO}$ respectively represent operation and maintenance costs of the coal-fired unit and the ventilation air oxidation unit, that is, the operation and maintenance costs per power, and $P_{CFU}^t$ and $P_{RTO}^t$ respectively represent outputs of the coal-fired unit and the ventilation air oxidation unit at the period t.

The carbon emission cost $C_{CO2}^{CFU-RTO}$ can be obtained by the following formula:

$$C_{CO2}^{CFU-RTO} = c_{carbon}\left(\sum_{t=1}^{T}(C_{grid}^{pro} + C_{grid}^{run})P_{grid}^t\Delta t + \sum_{t=1}^{T}(C_{vam}^{pro} + C_{vam}^{run})P_{RTO}^t\Delta t + \sum_{t=1}^{T}(C_{coal}^{pro} + C_{coal}^{run})P_{CFU}^t\Delta t - E_{all}\right)$$

where $c_{carbon}$ represents a carbon price, that is, a carbon emission permit price, $C_{grid}^{pro}$ and $C_{grid}^{run}$ respectively represent unit carbon emission coefficients (carbon emission coefficients per unit of electric quantity) in the production and conveying process of the power grid, $C_{vam}^{pro}$ and $C_{vam}^{run}$ respectively represent unit carbon emission coefficients (carbon emission coefficients per unit of power) in the production and conveying process of the ventilation air unit, $C_{coal}^{pro}$ and $C_{coal}^{run}$ respectively represent unit carbon emission coefficients (carbon emission coefficients per unit of power) in the production and conveying process of the coal-fired unit, $P_{grid}^t$ represents an electric quantity purchased by the park integrated energy system from the power grid at the period t, $P_{CFU}^t$ and $P_{RTO}^t$ respectively represent outputs of the coal-fired unit and the ventilation air oxidation unit at the period t, and $E_{all}$ represents a carbon quota and is a constant.

The waste ventilation air penalty cost $C_{vam}$ can be obtained by the following formula:

$$C_{vam} = \sigma_{vam}\sum_{t=1}^{T}(P_{RTO,max}^t - P_{RTO}^t)\Delta t$$

where $\sigma_{vam}$ represents a waste ventilation air unit penalty cost, and $P_{RTO,max}^t$ represents a maximum output value of the ventilation air oxidation unit at the period t.

The integrated operation cost $C_{RT}$ at the intraday stage can be obtained by the following formula:

$$C_{RT} = \sum_{w}\rho(w)(C_{trade,w}^{RT} + C_{penalty,w}^{RT} + C_{co_2,w}^{RT} + C_{operate,w}^{RT}) + (\Lambda \times CVaR_\varphi)$$

$$CVaR_\varphi = \xi + \frac{1}{1-\varphi}\sum_{w}Q_w\rho(w)$$

$$C_{trade,w}^{RT} + C_{penalty,w}^{RT} + C_{operate,w}^{RT} - \xi \leq Q_w \forall W$$

$$Q_w \geq 0 \forall w$$

where $\rho(w)$ represents a probability of a scenario, $C_{trade,w}^{RT}$, $C_{penalty,w}^{RT}$, $C_{co_2,w}^{RT}$ and $C_{operate,w}^{RT}$ respectively represent a net electricity-purchasing cost, a waste ventilation air penalty cost and a carbon emission cost under the scenario w as well as operation and maintenance costs of the coal-fired unit and the ventilation air oxidation and power generation unit, $\Lambda$ represents a weight factor of the emphasis degree on the market risk and is a constant, $CVaR_\varphi$ represents a condition risk value of the intraday operation cost, and $Q_w$ are auxiliary variables, and $\varphi$ represents a confidence degree and is a constant, for example, may be 80%. Of course, this is only one example, which is not limited in the present disclosure.

In addition, the operation optimization model further includes a constraint condition corresponding to the first objective function. For convenience of description, the constraint condition is referred to as a first constraint condition in the present disclosure. According to one embodiment of the present disclosure, the first constraint condition includes a constraint of the energy supply subsystem, a constraint of an energy cycle subsystem and a constraint of an energy storage subsystem.

The constraint of the energy supply subsystem includes: an operation constraint of a coal-fired unit, a start-stop constraint of the coal-fired unit, a cooperation operation constraint of a belt conveyor and a coal silo, an upper and lower limit constraint and a ramp constraint of the belt speed of the belt conveyor, a constraint between a coal import and export flow and a reserve of a clean coal silo, and a constraint between a coal import and export flow and a reserve of a gangue silo, which are specifically as follows:

The operation constraint of the coal-fired unit includes:

$$P_{CFU}^t = M_{coal}^t \times L_{coal} \times \eta_{CFU}$$

$$P_{CFU,min} \mu_{CFU}^t \leq P_{CFU}^t \leq P_{CFU,max} \mu_{CFU}^t$$

$$P_{CFU,min}^{ramp} \leq P_{CFU}^t - P_{CFU}^{t-1} \leq P_{CFU,max}^{ramp}$$

where $P_{CFU}^t$ and $P_{CFU}^{t-1}$ respectively represent outputs at the period t and the period (t−1) of the coal-fired unit, $M_{coal}^t$ represents a mass (kg/h) of the original coal of the coal-fired unit entering at the period t, $L_{coal}$ represents a calorific value (MWh/kg) of the original coal, $\eta_{CFU}$ represents an efficiency of the coal-fired unit, $\mu_{CFU}^t$ represents an operation state variable of the coal-fired unit at the period t, with a value of 1 or 0, $\mu_{CFU}^t$ with the value of 1 represents that the coal-fired unit is in an operation state at the period t, $\mu_{CFU}^t$ with the value of 0 represents that the coal-fired unit is in a stop state at the period t, $P_{CFU,min}$ and $P_{CFU,max}$ respectively represent a minimum output and a maximum output of the coal-fired unit, and $P_{CFU,min}^{ramp}$ and $P_{CFU,max}^{ramp}$ respectively represent a minimum ramp output and a maximum ramp output of the coal-fired unit.

The start-stop constraint of the coal-fired unit includes:

$$\mu_{CFU}^t - \mu_{CFU}^{t-1} = \mu_{CFU,su}^t - \mu_{CFU,sd}^t$$

$$\sum_{h=t-T_{CFU,su}^{min}+1}^{t} \mu_{CFU,su}^h \leq \mu_{CFU}^t \quad \forall t \geq T_{CFU,su}^{min} + 1$$

$$\sum_{h=t-T_{CFU,sd}^{min}+1}^{t} \mu_{CFU,sd}^h \leq 1 - \mu_{CFU}^t \quad \forall t \geq T_{CFU,sd}^{min} + 1$$

$$\mu_{CFU,su}^t + \mu_{CFU,sd}^t \leq 1$$

where $\mu_{CFU}^{t-1}$ represents an operation state variable of the coal-fired unit at the period (t−1), with values of 1 or 0, $\mu_{CFU,su}^t$ and $\mu_{CFU,sd}^t$ respectively represent start and stop action variables of the coal-fired unit at the period t, with values of 1 or 0, $\mu_{CFU,su}^h$ and $\mu_{CFU,sd}^h$ respectively represent start and stop action variables of the coal-fired unit at the period h, with values of 1 or 0, and $T_{CFU,su}^{min}$ and $T_{CFU,sd}^{min}$ respectively represent shortest operation time and shortest stop time of the coal-fired unit.

The cooperation operation constraint of a belt conveyor and a coal silo includes:

$$P_{con}^t = \frac{1}{\eta_d \eta_m} \left[ L_{con}(V^t)^3 + 3.6^2 L_{con}^2 (V^t)^3 \theta_1 + V^t \theta_2 + 3.6^2 L_{con}^2 V^t \theta_3 + 3.6 L_{con} V^t \theta_4 \right]$$

where $P_{con}^t$, represents a consumed power of the belt conveyor at the period t, $L_{con}$ represents a mass (kg/m) of coal transported on a belt per unit length; in some embodiments, it can be assumed that the belt conveyor operates stably, the value is a fixed value; $V^t$ represents a belt speed of the belt conveyor at the period t, $\theta_1$, $\theta_2$, $\theta_3$ and $\theta_4$ represent structural parameters of the belt conveyor, which are obtained through experiments; and $\eta_d$ and $\eta_m$ represent mechanical efficiencies and are constants.

The upper and lower limit constraint and a ramp constraint of the belt speed of the belt conveyor includes:

$$V_{min}^t \leq V^t \leq V_{max}^t$$

$$V_{min}^{ramp} \leq V^t - V^{t-1} \leq V_{max}^{ramp}$$

where $V_{min}^t$, and $V_{max}^t$ respectively represent a minimum belt speed and a maximum belt speed of the belt conveyor at the period t, $V_{min}^{ramp}$ and $V_{max}^{ramp}$ respectively represent a minimum ramp belt speed and a maximum ramp belt speed of the belt conveyor, and $V^{t-1}$ represents a belt speed of the belt conveyor at the period (t−1).

The constraint between a coal import and export flow and a reserve of a clean coal silo includes:

$$M_{silo1}^t = M_{silo1}^{t-1} + (\sigma_{silo1,in}^t - \sigma_{silo1,out}^t) \Delta t$$

$$0 \leq M_{silo1}^t \tau_{coal} \leq S_{max1}$$

where $M_{silo1}^t$ and $M_{silo1}^{t-1}$ respectively represent coal reserves (kg) of the clean coal silo at the period t and the period (t−1), $\sigma_{silo1,in}^t$ and $\sigma_{silo1,out}^t$ respectively represent masses (kg/h) of the original coal imported into and exported out of the clean coal silo at the period t, $\tau_{coal}$ represents a land occupation coefficient (kg/m$^2$) of the original coal, $S_{max1}$ represents an upper limit value of an area of the clean coal silo, and $\Delta t$ represents a duration of one period.

The constraint between a coal import and export flow and a reserve of a gangue silo includes:

$$M_{silo2}^t = M_{silo2}^{t-1} + (\sigma_{silo2,in}^t - \sigma_{silo2,out}^t) \Delta t$$

$$0 \leq M_{silo2}^t \tau_{coal} \leq S_{max2}$$

where $M_{silo2}^t$ and $M_{silo2}^{t-1}$ respectively represent coal reserves of the gangue silo at the period t and the period (t−1), $\sigma_{silo2,in}^t$ and $\sigma_{silo2,out}^t$ respectively represent masses of the original coal imported into and exported out of the gangue silo per unit time at the period t, and $S_{max2}$ represents an upper limit value of an area of the gangue silo.

The constraint of the energy cycle subsystem includes: an operation constraint of a microturbine, an operation constraint of a ventilation air oxidation and power generation unit, a start-stop constraint of the ventilation air oxidation and power generation unit and an operation constraint of a water source heat pump, which are specifically as follows:

the operation constraint of the microturbine includes:

$$P_{MT}^t = V_{gas}^t L_{CH_4} \eta_{MTE}^t$$

$$H_{MT}^t = V_{gas}^t L_{CH_4} \eta_{MTH}^t$$

$$P_{MT,min}^t \mu_{MT}^t \leq P_{MT}^t \leq P_{MT,max}^t \mu_{MT}^t$$

$$P_{MT,min}^{ramp} \leq P_{MT}^t P_{MT}^{t-1} \leq P_{MT,max}^{ramp}$$

$$P_{GDP}^t = \frac{V_{gas}^t H_{gas}}{\eta_{GDP}}$$

where $P_{MT}^t$ and $H_{MT}^t$ respectively represent a power generation output and a heat generation output of the microturbine at the period t, $V_{gas}^t$ represents a consumption rate of a gas at the period t, $L_{CH_4}$ represents a calorific value of methane, $\eta_{MTE}^t$ and $\eta_{MTH}^t$ respectively represent a power generation efficiency and a heat generation efficiency of the microturbine at the period t, $\mu_{MT}^t$ represents an operation state variable of the microturbine at the period t, with values of 1 or 0, $P_{MT,min}^t$ and $P_{MT,max}^t$ respectively represent a minimum power generation output and a maximum power generation output of the microturbine at the period t, $P_{MT,min}^{ramp}$ and $P_{MT,max}^{ramp}$ respectively represent a minimum ramp electricity output and a maximum ramp electricity output of the microturbine, $P_{MT}^{t-1}$ represents a power generation output of the microturbine at the period (t−1), $P_{GDP}^t$ represents an operation power of a gas extraction pump at the period t, $H_{gas}$ represents a gas pressure of the gas, and $\eta_{GDP}$ represents a mechanical efficiency of the gas extraction pump.

The operation constraint of the ventilation air oxidation and power generation unit includes:

$$H_{RTO}^t = Q_{Vent}^t L_{CH_4} \varphi_{CH_4} \eta_{RTO}(1-\eta_v^{RTO})$$

$$P_{RTO}^t = \frac{H_{RTO}^t}{\eta_{HER}}$$

$$H_{RTO,min}^t \mu_{RTO}^t \leq H_{RTO}^t \leq H_{RTO,max}^t \mu_{RTO}^t$$

$$H_{RTO,min}^{ramp} \leq H_{RTO}^t - H_{RTO}^{t-1} \leq H_{RTO,max}^{ramp}$$

$$P_{Vent}^t = \frac{Q_{Vent}^t H_{gas}}{\eta_{Vent}}$$

where $H_{RTO}^t$ and $P_{RTO}^t$ respectively represent a heat output and an electricity output of the ventilation air oxidation and power generation unit at the period t, $Q_{vent}^t$ represents a ventilation air flow (m³/h) at the period t, $\varphi_{CH_4}$ represents a concentration of the methane in the ventilation air, $\eta_{RTO}$ represents a heat generation efficiency of the ventilation air oxidation and power generation unit, $\eta_v^{RTO}$ represents a natural energy consumption rate, $\eta_{HER}$ represents a heat-to-electricity ratio, $\mu_{RTO}^t$ represents an operation state variable of the ventilation air oxidation and power generation unit at the period t, with values of 1 or 0, $H_{RTO,min}^t$ and $H_{RTO,max}^t$ respectively represent a minimum heat output and a maximum heat output of the ventilation air oxidation and power generation unit at the period t, $H_{RTO,min}^{ramp}$ and $H_{RTO,max}^{ramp}$ respectively represent a minimum ramp heat output and a maximum ramp heat output of the ventilation air oxidation and power generation unit, $H_{RTO}^{t-1}$ represents a heat output of the ventilation air oxidation and power generation unit at the period (t−1), $P_{Vent}^t$ represents an operation power of a mine ventilator at the period t, and $\eta_{Vent}$ represents a mechanical efficiency of the mine ventilator.

The start-stop constraint of the ventilation air oxidation and power generation unit includes:

$$\mu_{RTO}^t - \mu_{RTO}^{t-1} = \mu_{RTO,su}^t - \mu_{RTO,sd}^t$$

$$\sum_{h=t-T_{RTO,su}^{min}+1}^{t} \mu_{RTO,su}^h \leq \mu_{RTO}^t \quad \forall V \geq T_{RTO,su}^{min}+1$$

$$\sum_{h=t-T_{RTO,sd}^{min}+1}^{t} \mu_{RTO,sd}^h \leq 1-\mu_{RTO}^t \quad \forall V \geq T_{RTO,sd}^{min}+1$$

$$\mu_{RTO,su}^t + \mu_{RTO,sd}^t \leq 1$$

where $\mu_{RTO}^{t-1}$ represents an operation state variable of the ventilation air oxidation and power generation unit at the period (t−1), with the value of 1 or 0, $\mu_{RTO,su}^t$ and $\mu_{RTO,sd}^t$ respectively represent start and stop action variables of the ventilation air oxidation and power generation unit at the period t, with the value of 1 or 0, $\mu_{RTO,su}^t$ and $\mu_{RTO,sd}^t$ respectively represent start and stop action variables of the ventilation air oxidation and power generation unit at the period h, with the value of 1 or 0, and $\mu_{RTO,su}^h$ and $\mu_{RTO,sd}^h$ respectively represent shortest operation time and shortest stop time of the ventilation air oxidation and power generation unit.

The operation constraint of a water source heat pump includes:

$$H_{WSHP}^t = \eta_{WSHP} \times V_{gw}^t \times \Delta T \times \rho_{gw} \times c_{gw}$$

$$P_{GWP}^t = \frac{V_{gw}^t H_{gw}}{\eta_{GWP}} = \frac{V_{gw}^t \rho_{gw} g L_{gw}}{\eta_{GWP}}$$

$H_{WSHP}^t$ represents a heat generation power of the water source heat pump at the period t, $\eta_{WSHP}$ represents an energy conversion efficiency of the water source heat pump, $V_{gw}^t$ represents a water burst flow at the period t, $\Delta T$ represents a temperature difference, specifically, a temperature difference between the temperature of the mine burst water and the normal temperature (the temperature of the current environment, that is, the air temperature), $\rho_{gw}$ and $c_{gw}$ respectively represent a water burst density and a specific heat capacity, $P_{GWP}^t$ represents an electric power of the water burst pump at the period t, $H_{gw}$ represents a water pressure, that is, a water burst pressure intensity, $\eta_{GWP}$ represents a mechanical power of the water burst pump, and $L_{gw}$ represents a water pump head.

The constraint of the energy storage subsystem includes an operation constraint of pumped storage, a ramp constraint of charging and discharging powers of the pumped storage, and an operation constraint of a heat storage tank, specifically as follows:

an operation constraint of pumped storage includes:

$$E_{PHS}^t = (1-\tau_{PHS})E_{PHS}^{t-1} + (P_{PHSC}^t \eta_{PHSC} - P_{PHSD}^t / \eta_{PHSD})\Delta t$$

$$0 \leq P_{PHSC}^t \leq P_{HSC,max}^t \mu_{PHSC}^t$$

$$0 \leq P_{PHSD}^t \leq P_{HSD,max}^t \mu_{PHSD}^t$$

$$\mu_{PHSC}^t + \mu_{PHSD}^t \leq 1$$

$$E_{PHS}^{min} \leq E_{PHS}^t \leq E_{PHS}^{max}$$

$$E_{PHS}^0 = E_{PHS}^{24}$$

where $E_{PHS}^t$ and $E_{PHS}^{t-1}$ respectively represent electric storage quantities of the pumped storage at the period t and the period (t−1), $\tau_{PHS}$ represents a self-loss rate of the pumped storage, $P_{PHSC}^t$ and $P_{PHSD}^t$ respectively represent a charging power and a discharging power of the pumped storage at the period t, $\eta_{PHSC}$ and $\eta_{PHSD}$ respectively represent a charging efficiency and a discharging efficiency of the pumped storage, and $P_{PHSD,max}^t$ respectively represent a maximum charging power and a maximum discharging power of the pumped storage at the period t, $\mu_{PHSC}^t$ and $\mu_{PHSD}^t$ respectively represent a charging state variable and a discharging state variable of the pumped storage at the period t, with the value of 1 or 0, and $E_{PHS}^{min}$ and $E_{PHS}^{max}$ respectively represent a minimum electric storage quantity and a maximum electric storage quantity of the pumped storage. That is, the second formula dn the third formula are upper limit constraints of the charging and discharging powers, the third formula indicates that energy storage cannot perform charging and discharging at the same time, the fourth formula constrains the range of an electric storage quantity during normal operation of the energy storage, and the fifth formula is a continuous constrain of the energy storage.

A ramp constraint of charging and discharging powers of the pumped storage includes:

$$0 \le P_{PHSC}^t + P_{PHSD}^{t-1} P_{PHSC}^{ramp,max}$$

$$P_{PHSC}^{ramp,min} \le P_{PHSC}^t - P_{PHSC}^{t-1} \le P_{PHSC}^{ramp,max}$$

$$P_{PHSD}^{ramp,min} \le P_{PHSD}^t - P_{PHSD}^{t-1} \le P_{PHSD}^{ramp,max}$$

where $P_{PHSC}^{t-1}$ and $P_{PHSD}^{t-1}$ respectively represent a charging power and a discharging power of the pumped storage at the period (t−1), $P_{PHSC}^{ramp,min}$ and $P_{PHSC}^{ramp,max}$ respectively represent a minimum ramp power and a maximum ramp power of pumped storage charging, and $P_{PHSD}^{ramp,min}$ and $P_{PHSD}^{ramp,max}$ respectively represent a minimum ramp power and a maximum ramp power of pumped storage discharging. In some embodiments, $P_{PHSC}^{ramp,min}$ is equal to $P_{PHSD}^{ramp,min}$, and $P_{PSHC}^{ramp,max}$ is equal to $P_{PSHD}^{ramp,max}$.

An operation constraint of a heat storage tank includes:

$$E_{TST}^t (1-\tau_{TST}) E_{TST}^{t-1} + (H_{TSTC}^t \eta_{TSTC} - H_{TSTD}^t/\eta_{TSTD}) \Delta t$$

$$0 \le H_{TSTC}^t \le H_{TSTC,max}^t \mu_{TSTC}^t$$

$$0 \le H_{TSTD}^t \le H_{TSTD,max}^t \mu_{TSTD}^t$$

$$\mu_{TSTC}^t + \mu_{TSTD}^t \le 1$$

$$E_{TST}^{min} \le E_{TST}^t \le E_{TST}^{max}$$

$$E_{TST}^0 = E_{TST}^{24}$$

where $E_{TST}^t$ and $E_{TST}^{t-1}$ respectively represent electric storage quantities of the heat storage tank at the period t and the period (t−1), $\tau_{TST}$ represents a self-loss rate of the heat storage tank, $H_{TSTC}^t$ and $H_{TSTD}^t$ respectively represent a heating power and a heat release power of the heat storage tank at the period t, $\eta_{TSTC}$ and $\eta_{TSTD}$ respectively represent a heating efficiency and a heat release efficiency of the heat storage tank, $H_{TSTC,max}^t$ and $H_{TSTD,max}^t$ respectively represent a maximum heating power and a maximum heat release power of the heat storage tank at the period t, $\mu_{TSTC}^t$ and $\mu_{TSTD}^t$ respectively represent a heating state variable and a heat release state variable of the heat storage tank at the period t, with the value of 1 or 0, and $E_{TST}^{min}$ and $E_{TST}^{max}$ respectively represent a minimum heat storage quantity and a maximum heat storage quantity.

Further, in the some embodiments disclosure, the first constraint condition further includes an electric power and heat power equilibrium constraint of the park integrated energy system, an upper limit constraint of a renewable energy output, an upper limit constraint of an electricity purchasing quantity of a mineral integrated energy operator and an upper limit constraint of an electricity selling price, specifically as follows:

the electric power and heat power equilibrium constraint of the park integrated energy system includes:

$$P_{CFU}^t + P_{WT}^t + P_{PV}^t + P_{RTO}^t + P_{MT}^t + P_{PHSD}^t - P_{PHSC}^t + P_{grid}^t = P_{con}^t + P_{Vent}^t + P_{GDP}^t + P_{GWP}^t + P_{load}^t + P_{sell}^t$$

$$H_{WSHP}^t + H_{MT}^t + H_{RTO}^t + H_{TSTD}^t - H_{TSTC}^t = H_{load}^t$$

where $P_{WT}^t$ represents a power generation power of a fan at the period t, $P_{PV}^t$ represents a power generation power of photovoltaic at the period t, $P_{grid}^t$ represents an electric quantity purchased by the park integrated energy system from the power grid at the period t, $P_{load}^t$ represents a production electric load, and $H_{load}^t$ represents a production heat load.

The upper limit constraint of the renewable energy output includes:

$$0 \le P_{WT}^t \le \overline{P}_{WT}^t$$

$$0 \le P_{PV}^t \le \overline{P}_{PV}^t$$

where $\overline{P}_{WT}^t$ and $\overline{P}_{PV}^t$ respectively represent maximum power generation powers of the fan and the photovoltaic at the period t.

The upper limit constraint of the electricity purchasing quantity of the mineral integrated energy operator and the upper limit constraint of the electricity selling price include:

$$0 \le P_{grid}^t \le P_{grid}^{max}$$

$$0 \le \pi_{sell}^t \le \pi_{sell}^{max}$$

where $P_{grid}^{max}$ represents a maximum electricity purchasing quantity of the park integrated energy system, and $\pi_{sell}^{max}$ represents a highest electricity purchasing price of the park integrated energy system.

It is noted here that considering that the electric quantity of the renewable energy has strong uncertainty, in some embodiments, it can be directly modeled as a random variable. The operation optimization model is described above, and the user demand response model is described below.

The user demand response model includes an objective function. For convenience of description, the objective function is referred to as a second objective function in the present disclosure. Specifically, in some embodiments, the second objective function includes:

$$\min W_{user} = \sum_{t=1}^{T} P_{sell}^t \pi_{sell}^t + \sum_{t=1}^{T} \sum_{t'=1}^{T} \alpha_{SL}^t |t' - t| P_{tt'} + \sum_{t=1}^{T} [\alpha_{IL}^t (r_{IL}^t P_{user}^t - P_{IL}^t) + \beta_{IL}^t]$$

where $W_{user}$ represents the sum of the actual electricity-purchasing cost of the user and the electricity benefit loss in the demand response, $P_{sell}^t$ and $\pi_{sell}^t$ respectively represent an electric quantity and a price of the park integrated energy system participating in retail transaction at a period t, $\alpha_{SL}^{t}$ represents a benefit loss coefficient of a time transferable load at the period t, $P_{tt'}$ represents a load quantity transferred from the period t to a period t', $\alpha_{IL}^{t}$ and $\beta_{IL}^{t}$ represent benefit loss coefficients of a reducible load, $r_{IL}^{t}$ represents a proportion of the reducible load at the period t, that is, a proportion of the reducible load in the total load, $P_{user}^{t}$ represents a total load of the user at the period t, $P_{IL}^{t}$ represents a reducible load value at the period t, and T represents the total number of periods. That is, the first term in the above formula is a direct electricity-purchasing cost of the user, and the second item and the third item respectively are a time transferable load and an electricity benefit loss corresponding to the reducible load.

Further, the user demand response model further includes a constraint condition corresponding to the second objective function. For convenience of description, the constraint condition is referred to as a second constraint condition in the present disclosure. Specifically, the second constraint condition includes a constraint of the reducible load, a constraint of the time transferable load, and a constraint of the park integrated energy system participating in retail transaction.

The constraint of the reducible load includes:

$$0 \leq P_{IL}^{t} \leq r_{IL}^{t} P_{user}^{t} \forall t$$

The constraint of the time transferable load includes:

$$P_{tt'} \geq 0 \forall t, \forall t'$$

$$\sum_{t'=1}^{T} P_{tt'} = r_{SL}^{t} P_{user}^{t} \quad \forall t$$

wherein $r_{SL}^{t}$ represents a proportion of the time transferable load at the period t.

The electric quantity constraint of the park integrated energy system participating in retail transaction includes:

$$P_{user}^{min} \leq P_{sell}^{t} \leq P_{user}^{max} \forall t$$

$$P_{sell}^{t} = (1 - r_{IL}^{t} - r_{SL}^{t}) P_{user}^{t} + P_{IL}^{t} + \sum_{t'=1}^{T} P_{t't} \quad \forall t$$

where $P_{user}^{min}$ and $P_{user}^{max}$ respectively represent a minimum load and a maximum load of the user, and $P_{t't}$ represents a negative load transferred from the period t' to the period t.

So far, a short-time scale dynamic pricing model is constructed. Then, 220 is entered, and the short-time scale dynamic pricing model is solved based on a Karush-Kuhn-Tucker condition and a Benders decomposition method to obtain day-ahead and intraday scheduling plans and a next-day electricity price.

Regarding this step and considering that dynamic pricing is a two-layer and two-stage random mixed integer optimization problem, the present disclosure adopts two methods to deal with the computation complexity. First, the lower-layer problem is replaced with the necessary and efficient Karush-Kuhn-Tucker condition. Then, iterative solution is performed by a Benders decomposition method according to the master problem and subproblems divided at the day-ahead stage and the real-time stage, and convergence is accelerated in combination with a multi-cuts strategy.

Specifically, first, the optimal solution of the user demand response model is represented by the necessary and efficient Karush-Kuhn-Tucker condition. In this way, the short-time scale dynamic pricing model is converted from double layers into single layer.

Then, the converted short-time scale dynamic pricing model is divided into the master problem and subproblems, where related variables of the coal-fired unit and the ventilation air oxidation unit are taken as a complex variable to be optimized in the master problem, and each real-time scenario is taken as a subproblem. Specifically, the related variables of the coal-fired unit and the ventilation air oxidation unit may include $P_{CFU}^{t}$, $M_{coal}^{t}$, $\mu_{CFU}^{t}$, $P_{RTO}^{t}$, $\mu_{RTO}^{t}$, $Q_{vent}^{t}$ and $P_{Vent}^{t}$, that is, $P_{CFU}^{t}$, $M_{coal}^{t}$, $\mu_{CFU}^{t}$, $P_{RTO}^{t}$, $\mu_{RTO}^{t}$, $Q_{vent}^{t}$ and $P_{vent}^{t}$ are taken as complex variables to be optimized in the master problem.

Finally, the master problem and the subproblems are solved sequentially, and upper and lower bounds of the original objective function are computed and an optimal cut is separated until a difference value between the upper and lower bounds meet a convergence condition to obtain the day-ahead and intraday scheduling plans and the next-day electricity price. According to some embodiments of the present disclosure, the day-ahead scheduling plan includes the outputs of the coal-fired unit and the ventilation air oxidation and power generation unit, the scheduling result of the flow and reserve of the coal in the clean coal silo and the gangue silo, the electric quantity purchased from the power grid at the day-ahead stage, and the next-day retail electricity price; the intraday scheduling plan includes outputs of a heat pump, a microturbine and an energy storage device, an electric quantity purchased from the power grid at the intraday stage, and a scheduling quantity of a user demand response load; and the next-day electricity price refers a next-day dynamic price and specifically includes the electricity price at each period of the next day. It is noted here that the original objective function in this step refers to a function before the division of the master problem and the subproblems. In addition, the detailed solution process of the short-time scale dynamic pricing model is not elaborated herein, and details may refer to the description of Karush-Kuhn-Tucker and Multi-cuts Benders in the existing technology.

So far, a short-time scale dynamic pricing and scheduling plan is obtained. Further, in some embodiments, evolutionary game analysis is performed on the medium and long-time scale according to the short-time scale dynamic pricing and scheduling plan, and the market equilibrium state is deeply dug. First, it can be considered that CMIES, competitive retailers, load aggregators and other subjects are limited and rational direct driving factors taking the anticipated profit as strategy transfer, and information among the subjects is not shared. Then, based on the historical decision-making income, the regret degree matching model is used to describe the probability distribution of the purchasing and selling strategy of each subject in the next stage of decision making, the transfer process of the electricity seller bidding strategy in the modeling transition period and the evolution process of demand side user energy-purchasing share allocation, operation simulation research is carried out by taking the contract period as an iteration cycle to achieve a game equilibrium state, thereby finally obtaining the retail electricity price (time-of-use electricity price, such as 1*24, which is different in periods) issued by the mineral integrated energy operator to users in each contract period with in the preset deadline, and the corresponding income in each contract period. The income value corresponds to the upper-layer optimization objective result of the short-time pricing model in the operator strategy determined by this iteration, that is, the minimum integrated operation cost (including the electricity-selling income minus the operation cost, and the actual result should be negative, indicating the income). After the final preset deadline iteration ends and the correlated equilibrium is achieved, the pricing result capable of being suitable for the market subject strategy change and having higher total medium and long-time income compared with the traditional fixed single short-time pricing mode, specifically as follows.

In 230, based on the day-ahead and intraday scheduling plans and the next-day electricity price, compute a strategy transfer probability distribution of each market subject within a preset deadline by improved regret degree matching mechanism, and simulate a decision-making process by a Monte Carlo method until each market subject reaches a correlated equilibrium state to obtain a pricing solution of the park integrated energy system within the preset deadline.

Specifically, when the strategy transfer probability distribution of each market subject within the preset deadline is computed by the improved regret degree matching mechanism, according to some embodiments of the present disclosure, the strategy transfer probability of each market subject in the next contract period may be computed by the following formulas:

$$x_{n+1}^k(j) = \left(1 - \frac{\sigma}{n^\gamma}\right)\min\left\{\frac{1}{\lambda}R_n^k(j,i), \frac{1}{S^k}\right\} + \frac{\sigma}{n^\gamma}\frac{1}{s^k} \forall j \in \prod^k \text{ and } j \neq i$$

$$x_{n+1}^k(i) = 1 - \Sigma_{j \in \Pi^k \text{ and } j \neq i} x_{n+1}^k(j)$$

where $x_{n+1}^k(j)$ and $x_{n+1}^k(i)$ respectively represent a probability of selecting a new decision j and still insisting on the current decision i in the $(n+1)^{th}$ decision by the market subject k, $\sigma$ represents a weight factor of the current strategy preference degree, $\gamma$ is a constant and $\gamma \in (0, \frac{1}{4})$, $\lambda$ represents a proportionality coefficient and $\lambda \geq 2MS^k$, M represents upper bound values of utility functions of all the strategies in a strategy set of the market subject k, $S^k$ represents a cardinal number of the strategy set of the market subject k, $R_n^k(j,i)$ represents the regret degree of regretting selecting the current strategy i instead of selecting the strategy j by the market subject k after the $n^{th}$ decision, and $\Pi^k$ represents the strategy set of the market subject k.

In some embodiments, $R_n^k(j,i)$ may be obtained by the following formulas:

$$R_n^k(j,i) = \max\{D_n^k(j,i), 0\}$$

$$D_n^k(j,i) = \frac{1}{n}\left[\Sigma_{\tau \leq n: \mu_\tau^k = i} W_\tau^k(i \to j, \mu^{-k}) - \Sigma_{\tau \leq n: \mu_\tau^k = i} W_\tau^k(i, \mu^{-k})\right]$$

Further, since the information among the plurality of subjects is not shared, the $W_\tau^k(i \to j, \mu^{-k})$ item is difficult to compute. Therefore, in some embodiments, $D_n^k(j,i)$ may be solved by the following formula:

$$D_n^k(j,i) = \frac{1}{n}\left[\Sigma_{\tau \leq n: \mu_\tau^k = j} \frac{x_\tau^k(i)}{x_\tau^k(j)} W_\tau^k(j, \mu^{-k}) - \Sigma_{\tau \leq n: \mu_\tau^k = i} W_\tau^k(i, \mu^{-k})\right]$$

where $D_n^k(j,i)$ represents an average value of a benefit increment after the strategy i is replaced with the strategy j at the $n^{th}$ decision making of the market subject k, $W_\tau^k(i \to j, \mu^{-k})$ represents a benefit function value when the strategy i is replaced with the strategy j at the $\tau^{th}$ decision making of the market subject k and the strategies of other market subjects are not changed, $(i \to j, \mu^{-k})$ represents that the strategy i is replaced with the strategy j at the $\tau^{th}$ decision making of the market subject k and the strategies of other subjects are not changed, $W_\tau^k(i, \mu^{-k})$ and $W_\tau^k(j, \mu^{-k})$ respectively represent benefit function values of the strategies i and j used at the $\tau^{th}$ decision making of the market subject k (the strategies of other subjects are not changed), $\mu_\tau^k = i$ and $\mu_\tau^k = j$ respectively represent that the strategies at the $\tau^{th}$ decision-making selection of the market subject k are i and j, and $x_\tau^k(i)$ and $x_\tau^k(j)$ respectively represent the probability of selecting the strategies i and j at the $\tau^{th}$ decision making of the market subject k.

In addition, each market subject reaching the correlated equilibrium state means that the transfer probability of each market subject is gradually concentrated at a certain strategy. Specifically, whether each market subject reaches the correlated equilibrium state may be detected by the following formula:

$$\Sigma_{\mu \in S: \mu^k = j} \psi(\mu)(W^k(i, \mu^{-k}) - W^k(\mu)) \leq 0$$

where $\mu$ represents a vector formed by the current strategy of each market subject, S represents a vector space replaced by all possible strategies, $\mu^k = j$ represents that the current strategy of the market subject k is j, $\mu^{-k}$ represents a vector formed by the current strategy of other market subjects except the market subject k, $\psi(\mu)$ represents a probability corresponding to the strategy vector $\mu$, $W^k(i, \mu^{-k})$ represents a benefit function value of the market subject k replacing the strategy j with the strategy i (the strategies of other subjects are not changed), and $W^k(\mu)$ represents a benefit function value of the market subject k adopting the original strategy, that is, the benefit function value of the strategy adopted by the market subject, and similarly, the strategies of other subjects are not changed. In some embodiments, the integrated benefit function of the CMIES and the competitor retailer may be an actual electricity-selling income, and the integrated benefit function of the load aggregator may be the net electricity-purchasing cost and the electricity benefit loss caused by the demand response.

In a word, the meaning of the above formula is: each game subject realizes that under the premise that all the other subjects follow the same rule signal, the game subject can obtain the optimal benefit only by following the rule to make decision, and the income expected value of any other strategies are not greater than the value. That is, if each benefit-driven limited rational market subject adopts a regret degree matching mechanism for decision making, the benefits of all parties can be optimized when complete iteration is performed until correlated equilibrium. So far, the pricing solution of the park integrated energy system in each contract period within the preset deadline is obtained, where in this pricing solution, the benefit of the park integrated energy system can be optimized within the preset deadline. In addition, the simulation of the detailed computation process and decision-making process for the strategy transfer probability distribution is not elaborated herein, and details may be referenced to the description of the regret degree matching mechanism and the Monte Carlo method in the existing technology.

Finally, the preset deadline, the contract period, the market subjects and the strategies of the market subjects are described. The preset deadline is the long-time scale in this embodiment and is a deadline set in advance. In the specific embodiments, the deadline may be set according to the actual situation, for example, may be 5 years, which is not limited by the present disclosure. The contract period refers to a period for the mineral integrated energy operator and the user at the demand side to sign the contract, which is not limited by the present disclosure, for example, may be 1 month. The market subjects mainly include three subjects, such as the CMIES, the competitive retailer and the load aggregator. The strategy set of the competitive retailer may be a set of historical price curve clustering centers, or may adopt a price mode with a fixed proportion to a spot price, so that the strategy set is a discrete value of the fixed proportion. The strategy set of the CMIES may be a set representing an influence factor ρ of the competitor quotation on the CMIES pricing. Specifically, the penalty item may be added in the upper-layer optimization object of the dynamic pricing model to quantify the potential influence of the price level of the competitive retailer and constrain the price curve:

$$\min C_{all} = C_{trade} + C_{st} + C_{coal} + C_{operate}^{CFU\text{-}RTO} + C_{CO2}^{CU\text{-}RTO} + C_{vam} + \rho \|\bar{\pi}_{rival}^{t} - \pi_{sell}^{t}\|_2^2 + C_{RT}$$

where $\bar{\pi}_{rival}^{t}$ is a weighted average of quotation of the competitive retailer at the period t.

In conclusion, the present disclosure construct a multi-stage multi-level cooperative operation optimization model for a park integrated energy system containing a mineral industry user in a completely competitive retail market environment. On a short-time scale, considering the uncertainty of the renewable energy output, an energy flow and production scheduling cooperation two-stage random optimization model based on risk aversion is constructed, and the dynamic price is an equilibrium point of Stackleberg game. On a long-time scale, the evolutionary game analysis is carried out, the strategy transfer probability distribution of the market subject is described by the improved regret degree matching mechanism, and full iterative guidance achieves correlated equilibrium. The operation optimization model according to the present disclosure can reduce the operation cost and improve the energy utilization efficiency. It is considered that the risk aversion strategy can improve the robustness of the day-ahead optional solution adapted to the real-time situation and improve the operation benefit. The improved regret degree matching mechanism can guide the market subject to achieve correlated equilibrium, so that the mineral integrated energy operator can obtain a relatively sufficient market share on the premise of increasing the income.

Various technologies described herein can be implemented by combining with hardware or software or a combination thereof. Therefore, the method and the device according to the present disclosure, some aspects or parts of the method of the device according to the present disclosure can adopt the form of embedding a tangible medium, such as program codes (that is, instructions) in readable storage mediums of removable disks, U disks, floppy disks, CD-ROM or any other machines. When a program is loaded into a machine such as a computer and is executed by the machine, the machine becomes a device for practicing the present disclosure.

When the program codes are executed in a programmable computer, a computing device generally includes a processor, a processor-readable storage medium (including a volatile or non-volatile memory and/or storage element), at least one input apparatus, and at least one output apparatus. The memory is configured to store the program codes. The processor is configured to perform the method for performing multi-stage multi-level cooperative operation on a park integrated energy system containing a mineral industry user provided by the present disclosure according to the instructions in the program codes stored in the memory.

In the description provided herein, numerous specific details are set forth. However, it can be understood that the examples of the present disclosure may be implemented without these specific details. In some instances, well-known methods, structures and technologies are not shown in detail, such that understanding of the description is not obscured.

Similarly, it should be understood that in the above description of the exemplary embodiments of the present disclosure, various features of the present disclosure are sometimes grouped together into a single example, figure, or description thereof, in order to simplify the present disclosure and facilitate understanding of one or more aspects of the present disclosure. However, the disclosed method should not be interpreted as reflecting the following intention that the claimed invention requires more features than those explicitly recited in each claim.

As used herein, unless otherwise specified, ordinal numerals such as "first", "second" and "third" are used to describe a common object so as to only indicate different instances involving similar objects, without intention to imply that the objects thus described have to have a given order in terms of time, space, ordering or in any other way.

Although the present disclosure is described in terms of a limited number of examples, those skilled in the art may understand that other examples may be envisaged within the scope of the present disclosure thus described, having the benefit of the above description. In addition, it should be noted that the language used in the description is mainly selected for readability and teaching objectives, instead of explaining or defining the subject matter of the present disclosure. Therefore, without departing from the scope and spirit of the appended claims, many modifications and changes will be obvious to those of ordinary skill in the art. The disclosure of the present disclosure is illustrative rather than restrictive with respect to its scope, and the scope of the present disclosure is defined by the appended claims.

What is claimed is:

1. A method for performing multi-stage multi-level cooperative operation on a park integrated energy system containing a mineral industry user, comprising:

constructing a short-time scale dynamic pricing model, wherein the short-time scale dynamic pricing model comprises an upper-layer operation optimization model and a lower-layer user demand response model, the operation optimization model is constructed to minimize the sum of integrated operation costs at a day-ahead stage and an intraday stage, and the user demand response model is constructed to minimize the sum of an actual electricity-purchasing cost of the user and the electricity benefit loss in the demand response;

solving the short-time scale dynamic pricing model based on a Karush-Kuhn-Tucker condition and a Benders decomposition method to obtain day-ahead and intraday scheduling plans and a next-day electricity price; and based on the day-ahead and intraday scheduling plans and the next-day electricity price, computing a strategy transfer probability distribution of each market subject within a preset deadline by improved regret degree matching mechanism, and simulating a decision-making process by a Monte Carlo method until each market subject reaches a correlated equilibrium state to obtain a pricing solution of the park integrated energy system within the preset deadline, wherein the operation optimization model comprises a first objective function; the first objective function comprises:

$$\min C_{all} = C_{trade} + C_{st} + C_{coal} + C_{operate}^{CFU-RTO} + C_{CO2}^{CFU-RTO} C_{vam} + C_{RT}$$

wherein $C_{all}$ represents the sum of integrated operation costs at the day-ahead stage and the intraday stage, $C_{trade}$ represents a day-ahead market electricity-purchasing cost of the park integrated energy system and a net electricity-purchasing cost of the electricity selling income of the retail market, $C_{st}$ represents a device start-stop cost, $C_{coal}$ represents a fuel cost of a coal-fired unit, $C_{operate}^{CFU-RTO}$ represents an operation and maintenance cost of the coal-fired unit and a ventilation air oxidation and power generation unit, $C_{CO2}^{CFU-RTO}$ represents a carbon emission cost, $C_{vam}$ represents a waste ventilation air penalty cost, and $C_{RT}$ represents an integrated operation cost at the intraday stage;

the user demand response model comprises a second objective function; the second objective function comprises:

$$\min W_{user} = \sum_{t=1}^{T} P_{sell}^t \pi_{sell}^t + \sum_{t=1}^{T} \sum_{t'=1}^{T} \alpha_{SL}^t |t' - t| P_{tt'}^t + \sum_{t=1}^{T} [\alpha_{IL}^t (r_{II}^t P_{user}^t - P_{IL}^t) + \beta_{IL}^t]$$

wherein $W_{user}$ represents the sum of the actual electricity-purchasing cost of the user and the electricity benefit loss in the demand response, $P_{sell}^t$ and $\pi_{sell}^t$ respectively represent an electric quantity and a price of the park integrated energy system participating in retail transaction at a period t, $\alpha_{SL}^t$ represents a benefit loss coefficient of a time transferable load at the period t, $P_{tt'}$ represents a load quantity transferred from the period t to a period t', $\alpha_{IL}^t$ and $\beta_{SL}^t$ represent benefit loss coefficients of a reducible load, $r_{IL}^t$ represents a proportion of the reducible load at the period t, $P_{user}^t$ represents a total load of the user at the period t, $P_{IL}^t$ represents a reducible load value at the period t, and T represents the total number of periods;

the solving the short-time scale dynamic pricing model based on a Karush-Kuhn-Tucker condition and a Benders decomposition method comprises: representing the optimal solution of the user demand response model through the necessary and sufficient Karush-Kuhn-Tucker condition, and converting the short-time scale dynamic pricing model from double layers to a single layer; dividing the converted short-time scale dynamic pricing model into a master problem and subproblems, wherein related variables of the coal-fired unit and a ventilation air oxidation unit are taken as complex variables required to be optimized in the master problem, and each real-time scenario is taken as one subproblem; and sequentially solving the master problem and the subproblems, and computing upper and lower bounds of the original objective function and separating an optimal cut until a difference value between the upper and lower bounds meet a convergence condition to obtain the day-ahead and intraday scheduling plans and the next-day electricity price;

in the step of computing the strategy transfer probability distribution of each market subject within the preset deadline by the improved regret degree matching mechanism, the strategy transfer probability of each market subject in a next contract period is computed by the following formulas:

$$x_{n+1}^k(j) = \left(1 - \frac{\sigma}{n^\gamma}\right) \min\left\{\frac{1}{\lambda} R_n^k(j, i), \frac{1}{S^k}\right\} + \frac{\sigma}{n^\gamma} \frac{1}{S^k} \forall j \in \prod^k \text{ and}$$

$$j \neq i \; x_{n+1}^k(i) = 1 - \sum_{j \in \prod^k \text{ and } j \neq i} x_{n+1}^k(j)$$

wherein $x_{n+1}^k(j)$ and $x_{n+1}^k(i)$ respectively represent a probability of selecting a new decision j and still insisting on the current decision i in the $(n+1)^{th}$ decision by the market subject k, $\sigma$ represents a weight factor of the current strategy preference degree, $\gamma \in (0, \frac{1}{4})$, $\lambda$ represents a proportionality coefficient and $\lambda \geq 2MS^k$, M represents upper bound values of utility functions of all the strategies in a strategy set of the market subject k, $S^k$ represents a cardinal number of the strategy set of the market subject k, $R_n^k(j,i)$ represents the regret degree of regretting selecting the current strategy i instead of selecting the strategy j by the market subject k after the $n^{th}$ decision, and $\prod^k$ represents the strategy set of the market subject k; and whether each market subject reaches the correlated equilibrium state is detected by the following formula:

$$\sum_{\mu \in S : \mu^k = j} \psi(\mu) (W^k(i, \mu^{-k}) - W^k(\mu)) \leq 0$$

wherein $\mu$ represents a vector formed by the current strategy of each market subject, S represents a vector space replaced by all possible strategies, $\mu^k = j$ represents that the current strategy of the market subject k is j, $\mu^{-k}$ represents a vector formed by the current strategy of other market subjects except the market subject k, $\psi(\mu)$ represents a probability corresponding to the strategy vector $\mu$, $W^k(i, \mu^{-k})$ represents a benefit function value of the market subject k replacing the strategy j with the strategy i, and $W^k(\mu)$ represents a benefit function value of the market subject k adopting the original strategy.

2. The method according to claim 1, wherein the park integrated energy system comprises an energy supply subsystem, an energy recovery subsystem and an energy storage subsystem; and correspondingly, the operation optimization model comprises a constraint of the energy supply subsystem, a constraint of an energy cycle subsystem and a constraint of the energy storage subsystem.

3. The method according to claim 2, wherein the constraint of the energy supply subsystem comprises:

an operation constraint of the coal-fired unit:

$$P_{CFU}^t = M_{coal}^t \times L_{coal} \times \eta_{CFU}$$

$$P_{CFU,min} \mu_{CFU}^t \leq P_{CFU}^t \leq P_{CFU,max} \mu_{CFU}^t$$

$$P_{CFU,min}^{ramp} \leq P_{CFU}^t - P_{CFU}^{t-1} \leq P_{CFU,max}^{ramp}$$

wherein $P_{CFU}^t$ and $P_{CFU}^{t-1}$ respectively represent outputs at the period t and the period (t−1) of the coal-fired unit, $M_{coal}^t$ represents a mass of the original coal of the coal-fired unit entering at the period t, $L_{coal}$ represents a calorific value of the original coal, $\eta_{CFU}$ represents an efficiency of the coal-fired unit, $\mu_{CFU}^{t}$ represents an operation state variable of the coal-fired unit at the period t, with a value of 1 or 0, $P_{CFU,min}$ and $P_{CFU,max}$ respectively represent a minimum output and a maximum output of the coal-fired unit, and $P_{CFU,min}^{ramp}$ and $P_{CFU,max}^{ramp}$ respectively represent a minimum ramp output and a maximum ramp output of the coal-fired unit;

a start-stop constraint of the coal-fired unit:

$$\mu_{CFU}^{t}-\mu_{CFU}^{t-1}=\mu_{CFU,su}^{t}-\mu_{CFU,sd}^{t}$$

$$\sum_{h=t-T_{CFU,su}^{min}+1}^{t}\mu_{CFU,su}^{h} \leq \mu_{CFU}^{t} \quad \forall\, t \geq T_{CFU,su}^{min}+1$$

$$\sum_{h=t-T_{CFU,sd}^{min}+1}^{t}\mu_{CFU,sd}^{h} \leq 1-\mu_{CFU}^{t} \quad \forall\, t \geq T_{CFU,sd}^{min}+1$$

$$\mu_{CFU,su}^{t}+\mu_{CFU,sd}^{t}\leq 1$$

wherein $N_{CFU}$ represents an operation state variable of the coal-fired unit at the period (t−1), $\mu_{CFU,su}^{t}$ and $\mu_{CFU,sd}^{t}$ respectively represent start and stop action variables of the coal-fired unit at the period t, with values of 1 or 0, $\mu_{CFU,su}^{h}$ and $\mu_{CFU,sd}^{h}$ respectively represent start and stop action variables of the coal-fired unit at the period h, and $T_{CFU,su}^{min}$ and $T_{CFU,sd}^{min}$ respectively represent shortest operation time and shortest stop time of the coal-fired unit;

a cooperation operation constraint of a belt conveyor and a coal silo:

$$P_{con}^{t} = \frac{1}{\eta_{d}\eta_{m}}\left[L_{con}(V^{t})^{3}+3.6^{2}L_{con}^{2}(V^{t})^{3}\theta_{1}+V^{t}\theta_{2}+3.6^{2}L_{con}^{2}V^{t}\theta_{3}+3.6L_{con}V^{t}\theta_{4}\right]$$

wherein $P_{com}^{t}$ on represents a consumed power of the belt conveyor at the period t, $L_{con}$ represents a mass of coal transported on a belt per unit length, $V^{t}$ represents a belt speed of the belt conveyor at the period t, $\theta_{1}$, $\theta_{2}$, $\theta_{3}$ and $\theta_{4}$ represent structural parameters of the belt conveyor, and $\eta_{d}$ and $\eta_{m}$ represent mechanical efficiencies and are constants;

an upper and lower limit constraint and a ramp constraint of the belt speed of the belt conveyor:

$$V_{min}^{t}\leq V^{t}\leq V_{max}^{t}$$

$$V_{min}^{ramp}\leq V^{t}-V^{t-1}\leq V_{max}^{ramp}$$

wherein $V_{min}^{t}$ and $V_{max}^{t}$ respectively represent a minimum belt speed and a maximum belt speed of the belt conveyor at the period t, $V_{min}^{ramp}$ and $V_{max}^{ramp}$ respectively represent a minimum ramp belt speed and a maximum ramp belt speed of the belt conveyor, and $V^{t-1}$ represents a belt speed of the belt conveyor at the period (t−1);

a constraint between a coal import and export flow and a reserve of a clean coal silo:

$$M_{silo1}^{t}=M_{silo1}^{t-1}+(\sigma_{silo1,in}^{t}-\sigma_{silo1,out}^{t})\Delta t$$

$$0\leq M_{silo1}\tau_{coal}\leq S_{max1}$$

wherein $M_{silo1}^{t}$ and $M_{silo1}^{t-1}$ respectively represent coal reserves of the clean coal silo at the period t and the period (t−1), $\sigma_{silo1,in}^{t}$ and $\sigma_{silo1,out}^{t}$ respectively represent masses of the original coal imported into and exported out of the clean coal silo at the period t, $\tau_{coal}$ represents a land occupation coefficient of the original coal, $S_{max1}$ represents an upper limit value of an area of the clean coal silo, and $\Delta t$ represents a duration of one period; and a constraint between a coal import and export flow and a reserve of a gangue silo:

$$M_{silo2}^{t}=M_{silo2}^{t-1}+(\sigma_{silo2,in}^{t}-\sigma_{silo2,out}^{t})\Delta t$$

$$0\leq M_{silo2}\tau_{coal}\leq S_{max2}$$

wherein $M_{silo2}^{t}$ and $M_{silo2}^{t-1}$ respectively represent coal reserves of the gangue silo at the period t and the period (t−1), $\sigma\sigma_{silo2,in}^{t}$ and $\sigma_{silo2,out}^{t}$ respectively represent masses of the original coal imported into and exported out of the gangue silo at the period t, and $S_{max2}$ represents an upper limit value of an area of the gangue silo.

4. The method according to claim 2, wherein the constraint of the energy cycle subsystem comprises:

an operation constraint of a microturbine:

$$P_{MT}^{t}=V_{gas}^{t}L_{CH_{4}}\eta_{MTE}^{t}$$

$$H_{MT}^{t}=V_{gas}^{t}L_{CH_{4}}\eta_{MTH}^{t}$$

$$P_{MT,min}^{t}\mu_{MT}^{t}\leq P_{MT}^{t}\leq P_{MT,max}^{t}\mu_{MT}^{t}$$

$$P_{MT,min}^{ramp}\leq P_{MT}^{t}P_{MT}^{t-1}\leq P_{MT,max}^{ramp}$$

$$P_{GDP}^{t}=\frac{V_{gas}^{t}H_{gas}}{\eta_{GDP}}$$

wherein $P_{MT}$ and $H_{MT}$ respectively represent a power generation output and a heat generation output of the microturbine at the period t, $V_{gas}^{t}$ represents a consumption rate of a gas at the period t, $L_{CH_{4}}$ represents a calorific value of methane, $\eta_{MTE}^{t}$ and $\eta_{MTH}^{t}$ respectively represent a power generation efficiency and a heat generation efficiency of the microturbine at the period t, $\mu_{MT}^{t}$ represents an operation state variable of the microturbine at the period t, $P_{MT,min}^{t}$ and $P_{MT,max}^{t}$ respectively represent a minimum power generation output and a maximum power generation output of the microturbine at the period t, $P_{MT,min}^{ramp}$ and $P_{MT,max}^{ramp}$ respectively represent a minimum ramp electricity output and a maximum ramp electricity output of the microturbine, $P_{MT}^{t-1}$ represents a power generation output of the microturbine at the period (t−1), $P_{GDP}^{t-1}$ represents an operation power of a gas extraction pump at the period t, $H_{gas}$ represents a gas pressure of the gas, and $\eta_{GDP}$ represents a mechanical efficiency of the gas extraction pump;

an operation constraint of the ventilation air oxidation and power generation unit:

$$H_{RTO}^{t}=Q_{Vent}^{t}L_{CH_{4}}\varphi_{CH_{4}}\eta_{RTO}(1-\eta_{v}^{RTO})$$

$$P_{RTO}^{t}=\frac{H_{RTO}^{t}}{\eta_{HER}}$$

$$H_{RTO,min}{}^t\mu_{RTO}{}^t \leq H_{RTO}{}^t \leq H_{RTO,max}{}^t\mu_{RTO}{}^t$$

$$H_{RTO,min}{}^{ramp} \leq H_{RTO}{}^t - H_{RTO}{}^{t-1} \leq H_{RTO,max}{}^{ramp}$$

$$P_{Vent}^t = \frac{Q_{vent}^t H_{gas}}{\eta_{Vent}}$$

wherein $H_{RTO}{}^t$ and $P_{RTO}{}^t$ respectively represent a heat output and an electricity output of the ventilation air oxidation and power generation unit at the period t, $Q_{Vent}{}^t$ represents a ventilation air flow at the period t, $\theta_{CH4}$ represents a concentration of the methane in the ventilation air, $\eta_{RTO}$ represents a heat generation efficiency of the ventilation air oxidation and power generation unit, $\eta_v{}^{RTO}$ represents a natural energy consumption rate, $\eta_{HER}$ represents a heat-to-electricity ratio, $\mu_{RTO}{}^t$ represents an operation state variable of the ventilation air oxidation and power generation unit at the period t, $H_{RTO,min}{}^t$ and $H_{RTO,max}{}^t$ respectively represent a minimum heat output and a maximum heat output of the ventilation air oxidation and power generation unit at the period t, $H_{RTO,min}{}^{ramp}$ and $H_{RTO,max}{}^{ramp}$ respectively represent a minimum ramp heat output and a maximum ramp heat output of the ventilation air oxidation and power generation unit, $H_{RTO}{}^{t-1}$ represents a heat output of the ventilation air oxidation and power generation unit at the period (t−1), $P_{Vent}{}^t$ represents an operation power of a mine ventilator at the period t, and $\eta_{Vent}$ represents a mechanical efficiency of the mine ventilator;

a start-stop constraint of the ventilation air oxidation and power generation unit:

$$\mu_{RTO}{}^t - \mu_{RTO}{}^{t-1} = \mu_{RTO,su}{}^t - \mu_{RTO,sd}{}^t$$

$$\sum_{h=t-T_{RTO,su}^{min}+1}^{t} \mu_{RTO,su}^h \leq \mu_{RTO}^t \quad \forall t \geq T_{RTO,su}^{min}+1$$

$$\sum_{h=t-T_{RTO,sd}^{min}+1}^{t} \mu_{RTO,sd}^h \leq 1 - \mu_{RTO}^t \quad \forall t \geq T_{RTO,sd}^{min}+1$$

$$\mu_{RTO,su}{}^t + \mu_{RTO,sd}{}^t \leq 1$$

wherein $\mu_{RTO}{}^{t-1}$ represents an operation state variable of the ventilation air oxidation and power generation unit at the period (t−1), $\mu_{RTO,su}{}^t$ and $\mu_{RTO,sd}{}^t$ respectively represent start and stop action variables of the ventilation air oxidation and power generation unit at the period t, $\mu_{RTO,su}{}^h$ and $\mu_{RTO,sd}{}^h$ respectively represent start and stop action variables of the ventilation air oxidation and power generation unit at the period h, and $T_{CFU,su}{}^{min}$ and $T_{CFU,sd}{}^{min}$ respectively represent shortest operation time and shortest stop time of the ventilation air oxidation and power generation unit; and an operation constraint of a water source heat pump:

$$H_{WSHP}^t = \pi_{WSHP} \times V_{gw}^t \times \Delta T \times \rho_{gw} \times c_{gw}$$

$$P_{GWP}^t = \frac{V_{gw}^t H_{gw}}{\eta_{GWP}} = \frac{V_{gw}^t \rho_{gw} g L_{gw}}{\eta_{GWP}}$$

$H_{WSHP}{}^t$ represents a heat generation power of the water source heat pump at the period t, $\eta_{WSHP}$ represents an energy conversion efficiency of the water source heat pump, $V_{gw}{}^t$ represents a water burst flow at the period t, $\Delta T$ represents a temperature difference, $\rho_{gw}$ and $c_{gw}$ respectively represent a water burst density and a specific heat capacity thereof, $P_{GWP}{}^t$ represents an electric power of a water burst pump at the period t, $H_{gw}$ represents a water pressure, $\eta_{GWP}$ represents a mechanical power of the water burst pump, and $L_{gw}$ represents a water pump head.

5. The method according to claim 2, wherein the constraint of the energy storage subsystem comprises:

an operation constraint of pumped storage:

$$E_{PHS}^t = (1-\tau_{PHS})E_{PHS}^{t-1} + (P_{PHSC}^t \eta_{PHSC} - P_{PHSD}^t/\eta_{PHSD})\Delta t$$

$$0 \leq P_{PHSC}^t \leq P_{HSC,max}^t \mu_{PHSC}^t$$

$$0 \leq P_{PHSD}^t \leq P_{HSD,max}^t \mu_{PHSD}^t$$

$$\mu_{PHSC}^t + \mu_{PHSD}^t \leq 1$$

$$E_{PHS}^{min} \leq E_{PHS}^t \leq E_{PHS}^{max}$$

$$E_{PHS}^0 = E_{PHS}^{24}$$

wherein $E_{PHS}{}^t$ and $E_{PHS}{}^{t-1}$ respectively represent electric storage quantities of the pumped storage at the period t and the period (t−1), $\tau_{PHS}$ represents a self-loss rate of the pumped storage, $P_{PHSC}{}^t$ and $P_{PHSD}{}^t$ respectively represent a charging power and a discharging power of the pumped storage at the period t, $\eta_{PHSC}$ and $P_{PHSD}$ respectively represent a charging efficiency and a discharging efficiency of the pumped storage, $\Delta t$ represents a duration of one period, $P_{PHSC,max}{}^t$ and $P_{PHSD,max}{}^t$ respectively represent a maximum charging power and a maximum discharging power of the pumped storage at the period t, $\mu_{PHSC}{}^t$ and $\mu_{PHSD}{}^t$ respectively represent a charging state variable and a discharging state variable of the pumped storage at the period t, and $E_{PHS}{}^{min}$ and $E_{PHS}{}^{max}$ respectively represent a minimum electric storage quantity and a maximum electric storage quantity of the pumped storage;

a ramp constraint of charging and discharging powers of the pumped storage:

$$0 \leq P_{PHSC}^t + P_{PHSD}^{t-1} P_{PHSC}^{ramp,max}$$

$$P_{PHSC}^{ramp,min} \leq P_{PHSC}^t - P_{PHSC}^{t-1} \leq P_{PHSC}^{ramp,max}$$

$$P_{PHSD}^{ramp,min} \leq P_{PHSD}^t - P_{PHSD}^{t-1} \leq P_{PHSD}^{ramp,max}$$

wherein $P_{PHSC}{}^{t-1}$ and $P_{PHSD}{}^{t-1}$ respectively represent a charging power and a discharging power of the pumped storage at the period (t−1), $P_{PHSC}{}^{ramp,min}$ and $P_{PHSC}{}^{ramp,max}$ respectively represent a minimum ramp power and a maximum ramp power of pumped storage charging, and $P_{PHSD}{}^{ramp,min}$ and $P_{PHSD}{}^{ramp,max}$ respectively represent a minimum ramp power and a maximum ramp power of pumped storage discharging; and an operation constraint of a heat storage tank:

$$E_{TST}^t(1-\tau_{TST})E_{TST}^{t-1} + (H_{TSTC}^t \eta_{TSTC} - H_{TSTD}^t/\eta_{TSTD})\Delta t$$

$$0 \leq H_{TSTC}^t \leq H_{TSTC,max}^t \mu_{TSTC}^t$$

$$0 \leq H_{TSTD}^t \leq H_{TSTD,max}^t \mu_{TSTD}^t$$

$$\mu_{TSTC}^t + \mu_{TSTD}^t \leq 1$$

$$E_{TST}^{min} \leq E_{TST}^t \leq E_{TST}^{max}$$

$$E_{TST}^0 = E_{TST}^{24}$$

wherein $E_{TST}^t$ and $E_{TST}^{t-1}$ respectively represent electric storage quantities of the heat storage tank at the period t and the period (t−1), $\tau_{TST}$ represents a self-loss rate of the heat storage tank, $T_{TST}$ represents a self-loss rate of the heat storage tank, $H_{TSTC}^t$ and $H_{TSTD}^t$ respectively represent a heating power and a heat release power of the heat storage tank at the period t, $\eta_{TSTC}$ and $\eta_{TSTD}$ respectively represent a heating efficiency and a heat release efficiency of the heat storage tank, $H_{TSTC,max}^t$ and $H_{TSTD,max}^t$ respectively represent a maximum heating power and a maximum heat release power of the heat storage tank at the period t, $\mu_{TSTC}^t$ and $\mu_{TSTD}^t$ respectively represent a heating state variable and a heat release state variable of the heat storage tank at the period t, and $E_{TST}^{min}$ and $E_{TST}^{max}$ respectively represent a minimum heat storage quantity and a maximum heat storage quantity.

6. The method according to claim 2, wherein the operation optimization model further comprises an electric power and heat power equilibrium constraint of the park integrated energy system, an upper limit constraint of a renewable energy output, an upper limit constraint of an electricity purchasing quantity of a mineral integrated energy operator and an upper limit constraint of an electricity selling price.

7. The method according to claim 6, wherein the electric power and heat power equilibrium constraint of the park integrated energy system comprises:

$$P_{CFU}^t + P_{WT}^t + P_{PV}^t + P_{RTO}^t + P_{MT}^t + P_{PHSD}^t - P_{PHSC}^t + P_{grid}^t = P_{con}^t + P_{Vent}^t + P_{GDP}^t + P_{GWP}^t + P_{load}^t + P_{sell}^t$$

$$H_{WSHP}^t + H_{MT}^t + H_{RTO}^t + H_{TSTD}^t - H_{TSTC}^t = H_{load}^t$$

wherein $P_{CFU}^t$ represents an output of a coal-fired unit at the period t, $P_{WT}^t$ represents a power generation power of a fan at the period t, $P_{PV}^t$ represents a power generation power of photovoltaic at the period t, $P_{RTO}^t$ represents an electricity output of the ventilation air oxidation and power generation unit at th period t, $P_{MT}^t$ represents a power generation output of a microturbine at the period t, $P_{PHSC}^t$ and $P_{PHSD}^t$ respectively represent a charging power and a discharging power of the pumped storage at the period t, $P_{grid}^t$ represents an electric quantity purchased by the park integrated energy system from a power grid at the period t, $P_{con}^t$ represents a consumed power of a belt conveyor at the period t, $P_{Vent}^t$ represents an operation power of the mine ventilator at the period t, $P_{GDP}^t$ represents an operation power of the gas extraction pump at the period t, $P_{GWP}^t$ represents an electric power of the water burst pump at the period t, $P_{load}^t$ represents a production electric load, $H_{WSHP}^t$ represents a heat generation power of the water source heat pump at the period t, $H_{MT}$ represents a heat generation output of the microturbine at the period t, $H_{RTO}^t$ represents a heat output of the ventilation air oxidation and power generation unit at the period t, $H_{TSTC}^t$ and $H_{TSTD}^t$ respectively represent a heating power and a heat release power of the heat storage tank at the period t, and $H_{load}^t$ represents a production heat load.

8. The method according to claim 6, wherein the upper limit constraint of the renewable energy output comprises:

$$0 \leq P_{WT}^t \leq \overline{P}_{WT}^t$$

$$0 \leq P_{PV}^t \leq \overline{P}_{PV}^t$$

wherein $P_{WT}^t$ and $P_{PV}^t$ respectively represent power generation powers of the fan and the photovoltaic at the period t, and $\overline{P}_{WT}^t$ and $\overline{P}_{PV}^t$ respectively represent maximum power generation powers of the fan and the photovoltaic at the period t.

9. The method according to claim 6, wherein the upper limit constraint of the electricity purchasing quantity of the mineral integrated energy operator and the upper limit constraint of the electricity selling price comprise:

$$0 \leq P_{grid}^t \leq P_{grid}^{max}$$

$$0 \leq \pi_{sell}^t \leq \pi_{sell}^{max}$$

wherein $P_{grid}^t$ represents an electric quantity purchased by the park integrated energy system from the power grid at the period t, $P_{grid}^{max}$ represents a maximum electricity purchasing quantity of the park integrated energy system, and $\pi_{sell}^{max}$ represents a highest electricity purchasing price of the park integrated energy system.

10. The method according to claim 2, wherein the user demand response model comprises a constraint of the reducible load, a constraint of the time transferable load, and an electric quantity constraint of the park integrated energy system participating in retail transaction.

11. The method according to claim 10, wherein the constraint of the reducible load comprises:

$$0 \leq P_{IL}^t \leq r_{IL}^t P_{user}^t \forall t.$$

12. The method according to claim 10, wherein the constraint of the time transferable load comprises:

$$P_{tt} \geq 0 \forall t, \forall t'$$

$$\sum_{t'=1}^{T} P_{tt}^t = r_{SL}^t P_{user}^t \quad \forall t$$

wherein $r_{SL}^t$ represents a proportion of the time transferable load at the period t.

13. The method according to claim 10, wherein the electric quantity constraint of the park integrated energy system participating in retail transaction comprises:

$$P_{user}^{min} \leq P_{sell}^t \leq P_{user}^{max} \forall t$$

$$P_{sell}^t = (1 - r_{IL}^t - r_{SL}^t) P_{user}^t + P_{IL}^t + \sum_{t'=1}^{T} P_{t't} \quad \forall t$$

wherein $P_{user}^{min}$ and $P_{sell}^{max}$ respectively represent a minimum load and a maximum load of the user, $r_{SL}^t$ represents a proportion of the time transferable load at the period t, and $P_{t't}$ represents a load quantity transferred from the period t' to the period t.

14. A computing device, comprising:
at least one processor; and
a memory, storing a program instruction, wherein the program instruction is configured to be suitable for being executed by the at least one processor, and the program instruction comprises an instruction for performing the method according to claim 1.

15. A readable storage medium storing a program instruction, wherein when the program instruction is read and executed by a computing device, the computing device performs the method according to claim 1.

* * * * *